United States Patent
Moussaoui et al.

(10) Patent No.: US 12,058,397 B2
(45) Date of Patent: Aug. 6, 2024

(54) METHOD FOR DYNAMIC COMPUTATIONAL RESOURCE MANAGEMENT AND APPARATUS FOR IMPLEMENTING THE SAME

(71) Applicant: ATEME, Velizy Villacoublay (FR)

(72) Inventors: Abdelmajid Moussaoui, Villebon-sur-Yvette (FR); Thomas Guionnet, Rennes (FR); Sassan Pejhan, Princeton, NJ (US)

(73) Assignee: ATEME, Velizy Villacoublay (FR)

( * ) Notice: Subject to any disclaimer, the term of this patent is extended or adjusted under 35 U.S.C. 154(b) by 7 days.

(21) Appl. No.: 18/098,443

(22) Filed: Jan. 18, 2023

(65) Prior Publication Data

US 2023/0283825 A1    Sep. 7, 2023

(30) Foreign Application Priority Data

Jan. 18, 2022  (EP) .................................. 22305051

(51) Int. Cl.
*H04N 21/266* (2011.01)
*H04N 21/2385* (2011.01)
*H04N 21/24* (2011.01)

(52) U.S. Cl.
CPC ....... *H04N 21/266* (2013.01); *H04N 21/2385* (2013.01); *H04N 21/2402* (2013.01); *H04N 21/2405* (2013.01)

(58) Field of Classification Search
None
See application file for complete search history.

(56) References Cited

U.S. PATENT DOCUMENTS

| | | | |
|---|---|---|---|
| 10,104,405 B1 * | 10/2018 | Haltmayer | ....... H04N 21/23418 |
| 11,445,252 B1 * | 9/2022 | Kim | ................... H04N 21/2343 |

(Continued)

FOREIGN PATENT DOCUMENTS

WO    2013/163077 A1    10/2013

OTHER PUBLICATIONS

"OTT 101: Your Guide to Streaming Metrics that Matter," Conviva, May 3, 2021, retrieved from: https://www.conviva.com/ott-101-your-guide-to-streaming-metrics-that-matter/ on Jan. 17, 2023, 9 pages.

(Continued)

*Primary Examiner* — Jason K Lin
(74) *Attorney, Agent, or Firm* — Faegre Drinker Biddle & Reath LLP

(57) ABSTRACT

A method for managing computational resources allocated for encoding of one or more multimedia content streams for distribution in dynamic mode to viewing devices through a distribution network is proposed, which comprises, by a processing node of the distribution network: obtain, for a multimedia content stream corresponding to a channel distributed to the viewing devices, a value of a computational resource allocation criterion, wherein the computational resource allocation criterion comprises an audience measurement for the corresponding channel and a video content complexity of the multimedia content stream; and determine, based on the computational resource allocation criterion, an allocation of computational resources of a computing platform configured for encoding the multimedia content stream.

19 Claims, 7 Drawing Sheets

(56) References Cited

U.S. PATENT DOCUMENTS

| | | | | |
|---|---|---|---|---|
| 11,665,374 | B1* | 5/2023 | Waggoner | H04N 21/23439 |
| | | | | 725/105 |
| 2017/0164018 | A1* | 6/2017 | Yadav | H04N 7/06 |
| 2018/0359506 | A1* | 12/2018 | Hodge | H04L 65/70 |
| 2020/0186808 | A1 | 6/2020 | Joshi et al. | |
| 2021/0258626 | A1* | 8/2021 | Verma | H04N 21/26225 |

OTHER PUBLICATIONS

"MediaMelon: Go beyond analytics with streaming intelligence," MediaMelon Inc., 2023, retrieved from: https://mediamelon.com/ on Jan. 17, 2023, 5 pages.

"Get viewer data for a Wowza CDN stream target with the Wowza Video Rest API," Wowza Media Systems, LLC, May 25, 2022, retrieved from: https://www.wowza.com/docs/how-to-get-viewer-data-for-a-wowza-cdn-stream-target-by-using-the-wowza-streaming-cloud-rest-api on Jan. 17, 2023, 2 pages.

"Stream Targets," Wowza Video REST API Documentation, Wowza Media Systems, LLC, retrieved from: https://api.docs.cloud.wowza.com/current/tag/usage/#operation/liveUsageStreamTarget on Jan. 17, 2023, 14 pages.

"AGBoost Documentation," xgboost developers, 2022, retrieved from: https://xgboost.readthedocs.io/en/latest/, on Jan. 17, 2023, 2 pages.

Bilal et al., Crowdsourced Multi-View Live Video Streaming using Cloud Computing, IEEE Access, Jul. 24, 2017, vol. 5, paged 12635-12647.

Friedman, "Greedy Function Approximation: A Gradient Boosting Machine," Feb. 24, 1999, retrieved from: https://statweb.stanford.edu/~jhf/ftp/trebst.pdf on Jan. 17, 2023, pp. 1-39.

Mok et al., "Measuring the Quality of Experience of HTTP Video Streaming," Proceedings of the 12th IFIP/IEEE International Symposium on Integrated Network Management, IM 2011, Dublin, Ireland, May 23-27, 2011, retrieved from: http://www4.comp.polyu.edu.hk/~oneprobe/doc/im2011-qoe.pdf on Jan. 17, 2023, 8 pages.

Search Report and Search Opinion issued in related application EP 22305051.9, Jul. 14, 2022, 12 pages.

* cited by examiner

```
allocation [channels] <-- min_allocation[channel_config]
For c <-- 1 to Ncpus:
    For channel in channels:
        actual_alloc <-- allocation[channel]
        gain[channel] <-- $v_i * predicted\_bitrate\_gain(current\_alloc) + \lambda * (v_i * d_i)$
    End For
    chosen_channel <-- argmax(gain)
    allocation[chosen_channel] <-- allocation[chosen_channel] + 1
End For
```

FIG. 4a

```
allocation [channels] <-- min_allocation[channel_config]
For c <-- 1 to Ncpus:
    For channel in channels:
        actual_alloc <-- allocation[channel]
        gain[channel] <-- -- $(v_i + \sum_{j=1}^{M} k_j) * predicted\_bitrate\_gain(current\_alloc) + \lambda * (v_i * d_i)$
    End For
    chosen_channel <-- argmax(gain)
    allocation[chosen_channel] <-- allocation[chosen_channel] + 1
End For
```

FIG. 4b

```
allocation [channels] <-- min_allocation[channel_config]
For c <-- 1 to Ncpus:
    For channel in channels:
        actual_alloc <-- allocation[channel]
        gain[channel] <-- -- $(v_i + \sum_{j=1}^{M} k_j)$ * predicted_bitrate_gain(current_alloc) + $\lambda * (v_i * w_i)$
    End For
    chosen_channel <-- argmax(gain)
    allocation[chosen_channel] <-- allocation[chosen_channel] + 1
End For
```

FIG. 4c

METHOD FOR DYNAMIC COMPUTATIONAL RESOURCE MANAGEMENT AND APPARATUS FOR IMPLEMENTING THE SAME

CROSS-REFERENCE TO RELATED APPLICATIONS

This application claims priority benefit under 35 U.S.C. § 119(d) from European Patent Application No. 22 305 051.9, filed Jan. 18, 2022, the disclosure of which is incorporated by reference herein in its entirety.

FIELD

The present disclosure relates to the field of resource management for the processing of multimedia content, in particular for the management of computational resources of a video encoder for encoding multimedia content.

BACKGROUND

Video encoder implementations typically provide several trade-offs between resource consumption and video quality. For example, implementations of HEVC (High Efficiency Video Coding) video encoders provide a tuning parameter for configuring the HEVC encoder in order to achieve a desired trade-off between resource consumed by the video encoder, and video quality of the encoding.

It would be advantageous to improve the management of computational resources of video encoders in the framework of encoding multimedia content streams for distribution in dynamic mode to viewing devices, in particular through distribution networks using an Over-The-Top (OTT) infrastructure.

There is therefore a need for providing an improved resource allocation update scheme and apparatus and software implementing the same that address at least some of the above-described drawbacks and shortcomings of the conventional technology in the art.

It is an object of the present subject disclosure to provide an improved resource allocation scheme and apparatus implementing the same.

Another object of the present subject disclosure is to provide an improved resource allocation update scheme and apparatuses implementing the same.

Another object of the present subject disclosure is to provide an improved hardware resource allocation update scheme and apparatuses implementing the same for alleviating the above-described drawbacks and shortcomings of conventional schemes, in particular schemes provided by orchestration software solutions usable to deploy applications that require real-time or near real-time data processing.

SUMMARY

To achieve these objects and other advantages and in accordance with the purpose of the present subject disclosure, as embodied and broadly described herein, in one aspect of the present subject disclosure, a computer-implemented method for managing computational resources allocated for encoding of one or more multimedia content streams for distribution in dynamic mode to viewing devices through a distribution network is proposed, which comprises, by a processing node of the distribution network: obtain, for a multimedia content stream corresponding to a channel distributed to the viewing devices, a value of a computational resource allocation criterion, wherein the computational resource allocation criterion comprises an audience measurement for the corresponding channel and a video content complexity of the multimedia content stream; and determine, based on the computational resource allocation criterion, an allocation of computational resources of a computing platform configured for encoding the multimedia content stream.

Using a criterion which uses both a video complexity and an audience measurement—(e.g. a level of audience measurement criterion) as a computational resource allocation criterion, or in a computational resource allocation criterion, provides several advantages:

First, a level of audience measurement criterion advantageously provides a computational resource allocation criterion which is not related to an intrinsic characteristic of video content of the corresponding multimedia content stream. Therefore, using a mixed criterion which uses both a video complexity (which is an intrinsic characteristic of video content of the corresponding multimedia content stream) and an audience measurement advantageously mixes two criteria which are of different types: one criterion which is based on a video content intrinsic characteristic, and another criterion which not based on a characteristic of the video content.

As a consequence, the proposed scheme leverages the finding that both types of criterion can be used to dynamically adapt the computational resource allocation for obtaining improved encoding performances (e.g. in terms of reduced bitrate for a given video quality), in particular in a context of real-time or near real-time encoding of multimedia content streams distributed in live mode. Further, since several types of criterion are used for dynamically updating the allocation of computational resources to the encoding of one or more multimedia content streams, the proposed dynamic allocation scheme is more refined, and hence may provide better performances than a scheme that would only use one type of criterion.

Further, a level of audience measurement is particularly well suited for use for multimedia content streams which are distributed in dynamic mode (live distribution of multimedia streams), whereas leveraging the video complexity as a computational resource allocation criterion is well suited for all contexts, including that of live distribution of multimedia streams. Using an audience measurement-based criterion for updating the computational resource configuration of a video codec or encoder configured for encoding multimedia content streams distributed in dynamic mode allows taking into account audience measurement data that may be measured for each live channel among live channels respectively corresponding to the multimedia content streams. For example, computational resources allocated to the encoding of a multimedia content stream of high video complexity and/or corresponding to a channel (e.g. a sport channel) that enjoys a large audience may be dynamically increased, while inversely computational resources allocated to the encoding of a multimedia content stream of low video complexity and corresponding to a channel (e.g. a movie channel) that enjoys a more limited audience may be dynamically decreased.

In particular, a computing platform (e.g. one or more servers) configured to provide a live, real-time or near real-time video compression service, may advantageously be further configured to implement a method according to one or more embodiments of the present subject disclosure so as to provide a complexity and audience-aware live video compression service through complexity and audience aware dynamic resource allocation.

Further, a resource orchestrator, configured for a live, real-time or near real-time video compression service may advantageously be configured to implement a method according to one or more embodiments of the present subject disclosure so as to provide a complexity-aware and audience-aware dynamic resource orchestrator for live, real-time or near real-time video compression service.

The computational resources (expressed for example in CPU core units) may initially be allocated to the extent necessary for serving the computational resource needs for the encoding of each multimedia content stream to be encoded with predefined performances, and remaining resources (e.g. CPU cores not yet allocated) may then be allocated to one or more of the multimedia content streams based on audience measurement data collected for the channels corresponding to the multimedia content streams.

Additional information can therefore be used for obtaining an improved scheme for allocating computational resources of a platform for processing multimedia content streams.

Once computational resources have been allocated according to the present subject disclosure, the multimedia content streams may be processed (e.g. transcoded or encoded) by the processing platform (e.g. a video encoding or transcoding platform, whether or not cloud-based).

The proposed scheme may advantageously be implemented in any computing environment comprising a computational resource management unit configured according to one or more embodiments of the present subject disclosure, such as, for example—an orchestration environment.

In one or more embodiments, the computational resource allocation criterion may comprise a measured number of viewers of the channel.

In one or more embodiments, the allocation of computational resources may further be determined based on a minimum computational resource allocation for the channel.

In one or more embodiments, the proposed method may further comprise: determining an allocation of computational resources that minimizes an overall bitrate of the plurality of multimedia content streams after encoding, while maximizing a video quality by minimizing a distortion incurred by encoding the plurality of multimedia content streams.

In one or more embodiments, the proposed method may further comprise: determining an allocation of computational resources that minimizes an overall bitrate of the plurality of multimedia content streams after encoding, while maximizing a quality of experience for channels corresponding to the multimedia content streams.

In one or more embodiments, the proposed method may further comprise: determine, for the channel, an estimate of gain in bitrate reduction obtained if the channel is allocated additional computation resources for encoding the corresponding multimedia content stream.

In one or more embodiments, the proposed method may further comprise: obtain respective computational resource allocation criterion levels for a plurality of multimedia content streams respectively corresponding to channels in a plurality of channels distributed to viewers; perform one or more iterations of a channel allocation loop, wherein an iteration of index i comprises, for a current channel of the plurality of channels: determine for the current channel a respective channel gain based on a rate-distortion criterion $J_i = R_i + \lambda D_i$, where $D_i$ is a distortion measurement, $\lambda$ is a Lagrangian parameter, and $R_i$ is an overall bitrate measurement, wherein $R_i$ is determined based on an audience measurement for the current channel and an estimate of gain in bitrate reduction obtained if the current channel is allocated additional computation resources for encoding the corresponding multimedia content stream, and wherein $D_i$ is determined based on a distortion measurement and an audience measurement for the current channel; select, in the plurality of channels, a channel based on one or more respective channel gains; and allocate additional computational resources to encoding the multimedia content stream corresponding to the selected channel.

In one or more embodiments, the overall bitrate measurement $R_i$ may be determined based on a product of $v_i$ with the estimate of gain, wherein $v_i$ is an audience measurement for the current channel.

In one or more embodiments, the overall bitrate measurement $R_i$ may be determined based on a product of $(1+v_i)$ with the estimate of gain, wherein $v_i$ is an audience measurement for the current channel.

In one or more embodiments wherein the distribution network comprises a content delivery network, CDN, the overall bitrate measurement $R_i$ may be determined based on a product of $(\Sigma_{j=1}^{M} k_j + v_i)$ with the estimate of gain, wherein $v_i$ is an audience measurement for the current channel, M is a number of regions in the CDN, and $k_j$ is a weight value of index j assigned to an edge cache used for distribution of the current channel in the CDN.

In one or more embodiments, the distortion measurement of $D_i$ may be determined based on $d_i$, a distortion measurement for the current channel, and/or $QoE_i$, a Quality of Experience measurement for the current channel.

In one or more embodiments, the distortion measurement of $D_i$ may be determined based on the Quality of Experience measurement for the current channel $QoE_i$, and the Quality of Experience, QoE, measurement for the current channel may be determined based on one or more of the following QoE metrics: average of time taken by each player to start the playback; average of rebuffering time for all viewers; average of latencies to get the frame for all viewers; number of failed playback attempts; average number of dropped frames for all viewers of the channel; and average of rebuffering frequency for all viewers of the channel.

In one or more embodiments, the estimate of gain in bitrate reduction may be determined based on a prediction of bitrate gain determined using a machine learning algorithm.

In one or more embodiments, the machine learning algorithm may be configured to receive input data corresponding to one or more of the following input data parameters: current CPU allocation, current video quality, estimated video content complexity, video content frame width, video content frame height, video content frame rate, interlaced or progressive video content, and type of encoder.

In one or more embodiments, the machine learning algorithm may be a supervised learning algorithm, and the proposed method may further comprise: performing a training phase for training the supervised learning algorithm during which the supervised learning algorithm is trained with training data.

In one or more embodiments, the supervised learning algorithm may be configured to use online learning for performing an ongoing training during an inference phase of the supervised learning algorithm.

In one or more embodiments, the additional computational resources may comprise an additional CPU core used for encoding the corresponding multimedia content stream.

In another aspect of the present subject disclosure, an apparatus is proposed, which comprises a processor, and a memory operatively coupled to the processor, wherein the apparatus is configured to perform a method according to one or more embodiments proposed in the present subject disclosure.

In yet another aspect of the present subject disclosure, a non-transitory computer-readable medium encoded with executable instructions which, when executed, causes an apparatus comprising a processor operatively coupled with a memory, to perform a method according to one or more embodiments proposed in the present subject disclosure, is proposed.

For example, in some embodiments, the present subject disclosure provides a non-transitory computer-readable medium encoded with executable instructions which, when executed, causes an apparatus comprising a processor operatively coupled with a memory, to to perform a method for managing computational resources allocated for encoding of one or more multimedia content streams for distribution in dynamic mode to viewing devices through a distribution network is proposed, which comprises: obtain, by the processor, for a multimedia content stream corresponding to a channel distributed to the viewing devices, a value of a computational resource allocation criterion, wherein the computational resource allocation criterion comprises an audience measurement for the corresponding channel and a video content complexity of the multimedia content stream; and determine, by the processor, based on the computational resource allocation criterion, an allocation of computational resources of a computing platform configured for encoding the multimedia content stream.

In yet another aspect of the present subject disclosure, a computer program product comprising computer program code tangibly embodied in a computer readable medium, said computer program code comprising instructions to, when provided to a computer system and executed, cause said computer to perform a method according to an embodiment proposed in the present subject disclosure, is proposed.

In another aspect of the present subject disclosure, a data set representing, for example through compression or encoding, a computer program as proposed in the present subject disclosure, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIG. 1b shows curves of Bjontegaard Delta-Rate (BDRate) gain (in percentage with respect to a reference allocation) as a function of CPU allocation for the 6 exemplary video sequences of FIG. 1a;

FIG. 4a illustrates an exemplary computational resource allocation algorithm that may be used in one or more embodiments;

FIG. 4b illustrates an exemplary computational resource allocation algorithm that may be used in one or more embodiments;

FIG. 4c illustrates an exemplary computational resource allocation algorithm that may be used in one or more embodiments;

DETAILED DESCRIPTION

Figure 1A:
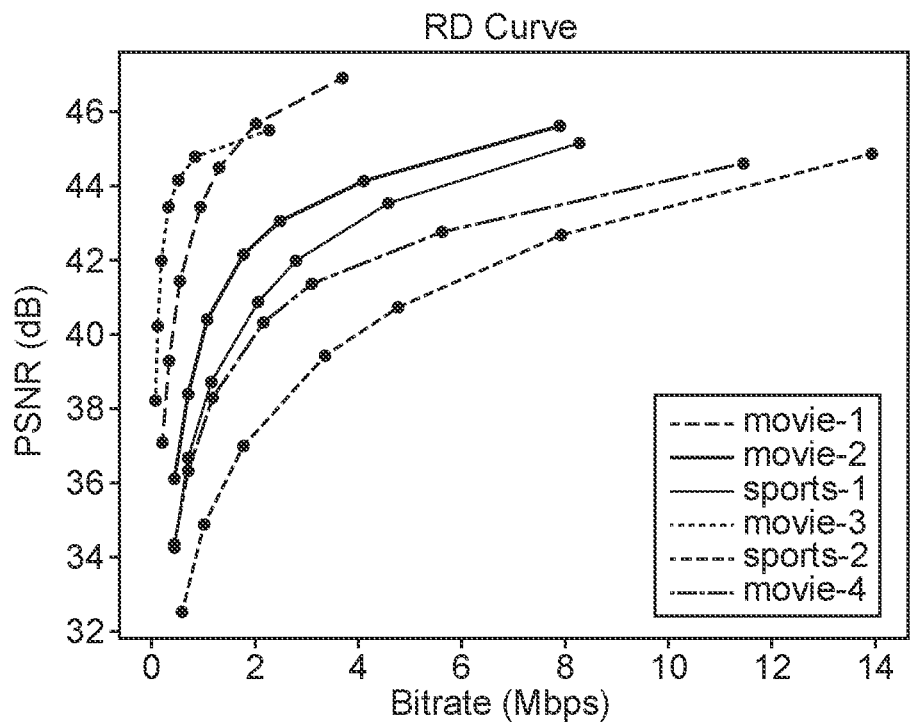
FIG. 1a shows exemplary rate-distortion curves for several encodings of 6 exemplary test video sequences of 12 minute-long movies and sports extracts.

For simplicity and clarity of illustration, the drawing figures illustrate the general manner of construction, and descriptions and details of well-known features and techniques may be omitted to avoid unnecessarily obscuring the discussion of the described embodiments of the present subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fiber, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "application," "program," or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset or an audio output.

The terms "multimedia content" as used in the present description correspond to any audio and/or video or audio-visual content, with or without closed captions, open captions, subtitles, timed text or visual descriptors.

The terms "computational resources" or "CPU resources" are used interchangeably in the present description to denote any computing or Central Processing Unit (CPU) resource usable on a computing platform for processing (e.g. encoding or transcoding) multimedia content, including without limitation one or more resources corresponding to one or more of the following types of processing resources and processing resource parameters: number of CPU cores, number of GPU cores, type of CPU architecture (e.g. RISC vs. CISC), type of processing unit (CPU, GPU, FPGA), CPU core speed, RAM resources (including one or more of the following: RAM size, RAM speed, etc.) associated with computational resources, storage type resources (hot vs. cold, etc.). In one or more embodiments, the computational resources may be allocated in CPU core units, so that the proposed scheme may comprise, depending on the embodiment, the determination of a number of CPU cores to be allocated to a channel corresponding to a multimedia content stream to be encoded, or the determination of respective numbers of CPU cores to be respectively allocated to channels corresponding to multimedia content streams.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated, as opposed to distributing content generated previously, upon an access request from a user (distribution upon an access request or "static" distribution or distribution in static mode), such as for example content recorded on a server and made available to users by a video on demand (VOD) service. Likewise, the terms "live encoding" or "live transcoding" are used interchangeably to denote the encoding (respectively the transcoding) of multimedia content distributed in live mode or in dynamic mode.

In the present description, the term "real-time" as used herein in the context of video distribution, video encoding or compressing video content, refers to the encoding or compression of video content at least at the same speed, for example expressed in frames per second, as it is generated by one or more video content sources. For instance, if content is generated at 50 frames per second (fps) it will be deemed encoded in real-time as long as it is also encoded at at least 50 fps.

In the present description, the terms "live content" or "live channel" are used interchangeably to denote or refer to corresponding content, for example multimedia content, of a multimedia content stream, that is distributed, for example using an Over-The-Top (OTT) distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "client" and "client unit" are used interchangeably to denote any type of device, implemented by one or more items of software, one or more items of hardware, or a combination or one or more items of software and one or more items of hardware, configured to present requests, such as resource allocation requests, to a resource management unit according to embodiments of the present subject disclosure, and to receive responses to such requests.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols and interoperate with larger networks. Various types of equipment may be used to make various architectures or various protocols interoperable. For example, a router may be used to provide a communication link or a data link between two LANs that would otherwise be separate and independent.

The proposed methods may be implemented by any video encoder or video codec configured for encoding or encoding and decoding images (or frames) of input video data, in particular configured for encoding and/or decoding live video content in real-time or near real-time, such as, for example, a video encoder and/or decoder compliant with the any of the H.261, MPEG-1 Part 2, H.262, MPEG-2 Part 2, Alliance for Open Media (AOM) AV1, H.264/AVC, H.265/HEVC, MPEG-4 Part 2, SHVC (Scalable HEVC), H.266/VVC, and MPEG-5 EVC specifications or standards, whether in their existing versions and/or their evolutions, as the case may be adapted for implementing one or more embodiments of the proposed methods.

Codec elasticity is a feature that designates the ability for a codec (e.g. a video codec) to modify its configuration (including dynamically), whether automatically or further to a configuration change command (e.g. received through a user interface), in order to achieve one or more predetermined performance quality vs. computational complexity compromises. The present subject disclosure advantageously allows using an audience measurement-based criterion for updating the computational resource configuration of a video codec or video encoder configured with elasticity for encoding one or more multimedia content streams distributed in dynamic mode to viewing devices through a distribution network.

FIG. 1a shows exemplary rate-distortion curves for several encodings of 6 exemplary test video sequences of 12 minute-long movies and sports extracts: "movie-1", "movie-2", "sports-1", "movie-3", "sports-2", and "movie-4". The 6 exemplary test video sequences were encoded using an HEVC video encoder implementation.

As can be seen on FIG. 1a, the video complexity of a given video sequence will influence the output bitrate needed (and therefore the amount of computational resources needed) for achieving a given quality level (such as, as illustrated on FIG. 1a, a given peak signal-to-noise ratio (PSNR) level). For example, the "sports-2" sequence, which is deemed to have a high video content complexity, needs more bitrate (almost 12 Mbps) in order to achieve a PSNR of 44 dB, whereas the "movie-3" sequence, which is deemed to have a lesser video content complexity, requires a lesser bitrate (approximately 2 Mbps) in order to achieve the same quality level (PSNR of 44 dB). Therefore, as illustrated by FIG. 1a, channels that correspond to multimedia content streams with high video content complexity (comparatively with other distributed multimedia content streams with lower video content complexity) will require a higher output bitrate (and therefore more computational resources) in order to achieve a given quality level (e.g.

expressed by a PSNR level) than channels that correspond to multimedia content streams with lower video content complexity.

Figure 1B:
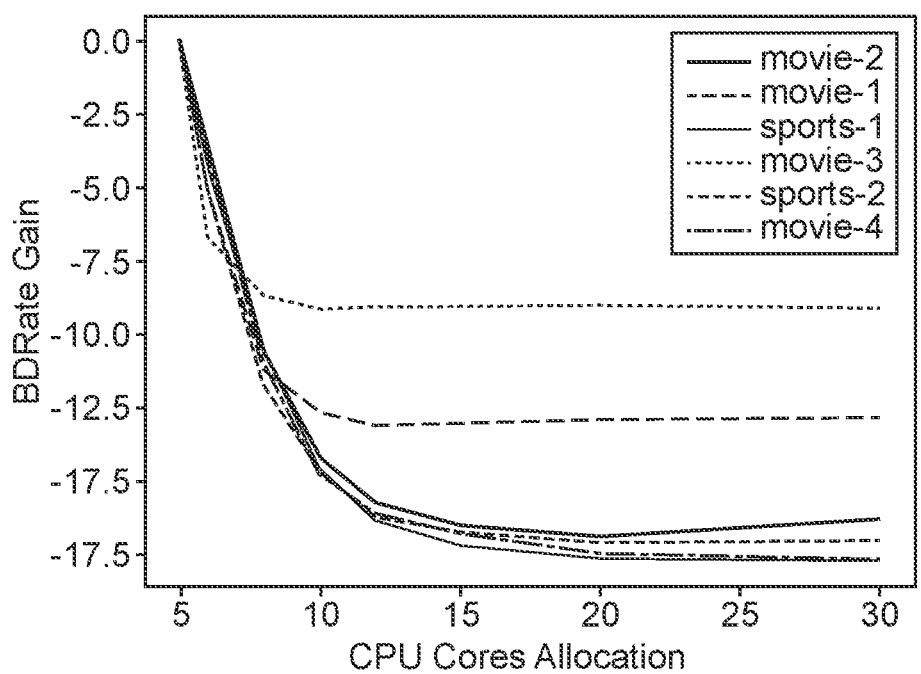

The gain achieved by increasing computational resources (such as the number of CPU cores) allocated to the encoding (e.g. HEVC encoding) of video content varies depending on the level of content complexity of such video content, as illustrated by FIG. 1b.

FIG. 1b shows curves of Bjontegaard Delta-Rate (BDRate) gain (in percentage with respect to a reference allocation) as a function of CPU allocation for the 6 exemplary test video sequences of FIG. 1a.

As shown by FIG. 1b, the BDRate gain in percentage of a given CPU allocation (measured with respect to a reference allocation, e.g. of 5 CPU cores in the example of FIG. 1b) varies as a function of the content complexity of the encoded video sequence. In particular, with respect to managing computational resources allocated for encoding a multimedia content stream, FIG. 1b illustrates that the bitrate gain achieved by increasing computational resources allocated to encoding the multimedia content stream (for example by adding a CPU core allocated to the encoding) varies depending on the video content complexity of the multimedia content stream: for example, the achieved bitrate gain is not the same if a CPU Core is added to a low complexity video content (such as "movie-3") or to a high complexity video content (such as "sports-2"). For a given channel (corresponding to a multimedia content stream), the performances of the video encoder (e.g. measured by a BDRate gain) will increase with the computational resource allocation, however only to a certain extent: for some channels, increasing the computational resources allocated to encoding the corresponding multimedia content stream will not result in a higher performance (e.g. a better BDRate gain), so that allocating additional computational resources beyond a certain threshold can be considered inefficient in terms of encoding performance gain. For example, FIG. 1b shows the BDRate gain obtained with encoding each of the 6 test video sequences of FIG. 1a with different computational resource allocations (from 5 to 30 allocated CPU cores). For example, the "sports-2" sequence, which is deemed to have a high video content complexity, requires an allocation of 15 to 20 CPU cores in order to achieve a BDRate gain of −17.5, whereas the "movie-3" sequence, which is deemed to have a lesser video content complexity, requires a lesser number of CPU cores allocation (approximately 8 to 10 CPU cores) in order to achieve the same video encoder performance (BDRate gain of −17.5).

FIG. 1b therefore shows that the codec elasticity of a video encoder (or video codec) may advantageously be used in order to dynamically determine computational resource allocations for the encoding of multimedia content streams. Relevant computational resource allocation criteria may be investigated for determining such allocations.

Therefore, FIG. 1a shows that different video sequences may have different intrinsic characteristics (such as, for example, different video content complexity, as sport video sequences are typically more complex than movie video sequences), and that the more CPU cores are allocated to encoding a video sequence (for achieving a higher output bitrate) the more efficient the codec is. FIG. 1b shows that the bitrate gain is not the same if a CPU core is added to a low complexity video sequence (e.g. "movie-3") or to a high complexity video sequence (e.g. "sports-2"), and therefore shows the impact that such an intrinsic characteristic (video content complexity) of a video sequence may have on the allocation of computational resources for encoding such video sequences. For example, as shown by FIG. 1b, an encoding performance which may be deemed satisfactory or even optimum can be achieved with only 8 to 10 allocated CPU cores for the "movie-3" test video sequence (which is deemed to have a low video content complexity) while, in comparison, the "sports-1" test video sequence (which is deemed to have a much higher video content complexity) requires up to 20 to 25 allocated CPU cores to achieve the same encoding performance level.

As provided by the present subject disclosure, a so-called "multidimensional" (or so-called "mixed" or "complex") computational resource allocation criterion that uses both a video content complexity-based criterion and channel audience measurement-based criterion may advantageously be used as a computational resource allocation criterion to determine, including dynamically, an allocation of computation resources for encoding one or more multimedia content streams, in particular in the context of live distribution of such streams.

The present subject disclosure therefore provides the use of a channel audience measurement-based and video content complexity-based mixed criterion as a computational resource allocation criterion for encoding one or more video sequences, that is, a computational resource allocation criterion which is not based on an intrinsic characteristic of a video sequence to be encoded.

The channel audience measurement-based and video content complexity-based mixed criterion which is proposed to be used, according to the present subject disclosure, as a computational resource allocation criterion, therefore advantageously mixes different types of computational resource allocation criterion, in that it mixes a criterion which is based on intrinsic characteristics of video content to be encoded with a criterion which is foreign to intrinsic characteristics of video content to be encoded.

The proposed method may advantageously be implemented in video encoders that are elastic, that is, that can be dynamically configured with respect to allocating computational resources for encoding one or more multimedia content streams distributed in dynamic mode to viewing devices through a distribution network based on one or more computational resource allocation criteria.

The video delivery of digital television (also sometimes referred to as live video streaming) has undergone significant changes in recent years. New audiovisual services such as video on demand (VOD), or catch-up TV (or replay) have been added to conventional schemes for linear TV distribution (through ADSL (asymmetric digital subscriber line), satellite, cable, IPTV, fiber, digital terrestrial television (DTT), etc.) carried out in dynamic mode via pay-TV operators (e.g. satellite TV operators and/or Internet service providers (ISPs)).

The design of new terminals that are ever more powerful and more mobile, the growing demand for consumption of content independent of the location of the consumer (TV everywhere), as well as the development of network infrastructures offering ever more bandwidth, have led to the emergence of a new market, sometimes referred to as the over-the-top (OTT) market, that does not require ownership of the access network used by users. The OTT market therefore operates on so-called unmanaged networks (i.e. with bandwidth and quality of service (QoS) not guaranteed). Multi-screen OTT services are provided by broadcasters/rebroadcasters, i.e. television broadcasters and telecom operators.

The infrastructure used for content delivery has thus been doubled, and live video streaming can be performed through different infrastructures and service offerings: an infrastructure for the traditional linear TV distribution, and another infrastructure for the OTT media streaming.

In order to address multi-screen content delivery services, various protocols have been developed: Apple HLS (HTTP Live Streaming), Microsoft Smooth Streaming (MSS), Adobe HTTP Dynamic Streaming (HDS), MPEG Dynamic Adaptive Streaming over HTTP (MPEG-DASH). All of these protocols are based on the concept of http adaptive streaming (HAS).

Multi-screen content delivery typically uses a video delivery network head end comprising a video encoding unit that receives content to be encoded as input and delivers to a packager encoded streams known as "elementary streams". Content received as input is encoded according to a plurality of encoding profiles (a profile being for example defined with codec, resolution and bit-rate parameters).

The encoded streams (elementary streams) delivered by the video encoding unit are split within the packager into at least two sequences, audio and video sequences respectively, of successive segments, the segments generally being of set duration (typically a few seconds) and of format dependent on the chosen protocol (for example MPEG2-TS, MP4, etc.). For each content, a set of metadata relative to multimedia contents, which is sometimes referred to as a media presentation description (MPD), a manifest, or a container, is also generated by the packager, for example in the form of a file (for example in XML format), indicating the characteristics of each profile and the available segments corresponding to the content.

OTT streaming over a Content Delivery Network is one commonly used infrastructure for live and VOD streaming. In these schemes, the manifests and the associated segments are typically supplied by the packager to a content server (sometimes referred to as the "Origin server"), then stored on a content delivery networks (CDN) which provide cache capacities that makes it possible to improve quality of service, and to minimize access times and the latency with which content may be viewed by player terminals.

A terminal for playing video content delivered in dynamic mode (for example a terminal configured within a user device such as a smartphone, tablet or any type of computer), or in other words dynamic or live video content (as opposed to static video content, such as VOD content for example), will typically be configured to play this content using the information contained in the manifest associated with the content.

Figure 2:
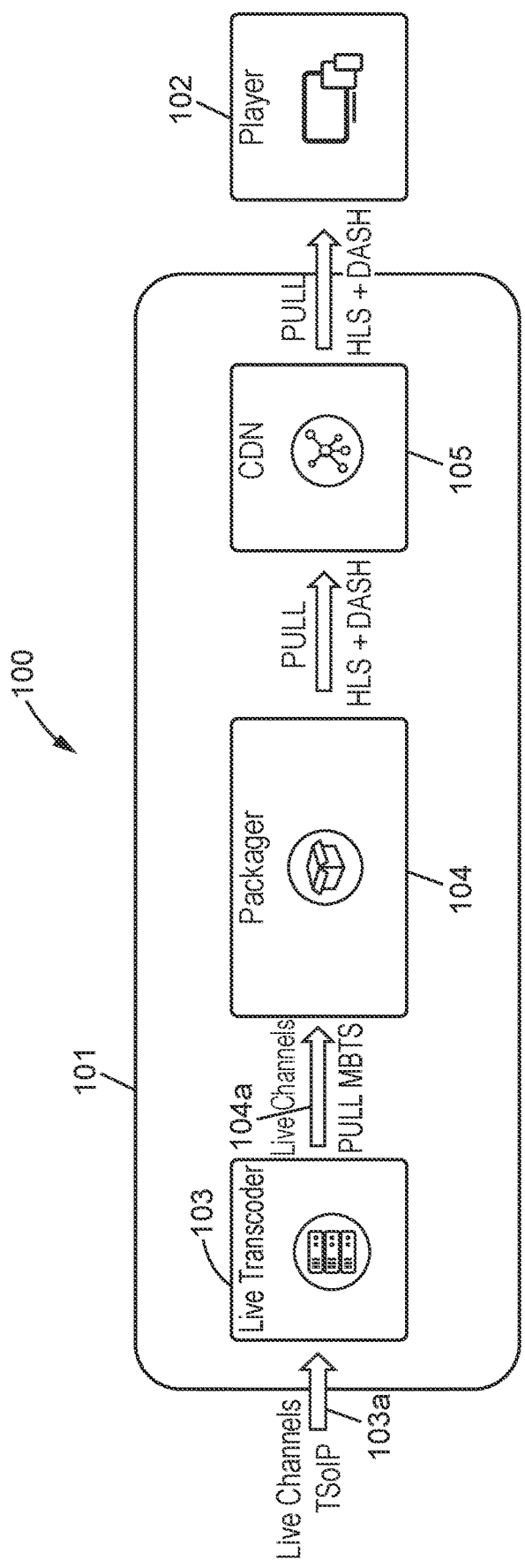
FIG. 2 shows an exemplary multimedia content distribution system according to one or more embodiments.

FIG. 2 shows an exemplary multimedia content distribution system 100 according to one or more embodiments of the subject disclosure.

Shown on FIG. 2 is a system 100 comprising multimedia (e.g. video) content distribution subsystem 101 configured to deliver multimedia content to one or more terminals (shown as players 102) at the end of a distribution chain, for example upon request of such players.

As illustrated in FIG. 2, the subsystem 101 may typically comprise a transcoder subsystem 103 configured for receiving content to be encoded (live channels 101a) as input data, and for delivering to an Origin/Packager subsystem 104 encoded streams. A content received as input by the transcoder 103 is encoded according to a plurality of encoding profiles (a profile being for example defined with codec, resolution and bit-rate parameters) to generate a plurality of encoded multimedia content streams (which may also be referred to as "source media flows" or "elementary streams") with different quality levels which are output as live channels 104a to the packager 104. Using a plurality of encoding profiles has at least two advantages: First of all, a plurality of profiles makes it possible to address player terminals with different characteristics (supported codecs, screen resolution, decoding power). Furthermore, it allows the video players of these terminals to adapt depending on the available network bandwidth. Specifically, the player of a client (of a terminal) may be configured to seek to achieve the encoding profile corresponding to the highest bit rate, depending on bandwidth measurements that it continuously performs.

The encoded streams delivered by the transcoder 103 to the packager 104 are split by the packager 104 into two sequences, audio and video sequences respectively, of successive segments, these segments generally being of set duration (typically a few seconds) and of format dependent on the chosen multimedia content distribution protocol (for example MPEG2-TS, MP4, etc.). For each content, a set of metadata relative to multimedia contents, or manifest, is also generated by the packager 104. The manifest may typically take the form of a file, for example in XML format, indicating the characteristics of each encoding profile and the available segments corresponding to the content.

The packager subsystem 104 may therefore typically be configured to receive as input the encoded streams, and to generate OTT content comprising manifests and associated segments upon request received from a player 102 through a data communication network 105 to which it is connected. The data communication network 105 may comprise one or more Content Delivery Networks (CDN) networks which may be provided in the subsystem 101 as an intermediary between the terminals 102 and the packager subsystem 104 configured for serving requests for content originated from the terminals 102. The CDN networks 105 may provide cache capacities that make it possible to improve the quality of service provided to users, and to minimize access times and the latency with which content may be viewed by player terminals 102.

The contents stored in servers of the CDN networks 105 are read accessible to user terminals (102), by means of a service platform for the delivery of the contents. Clients installed in the terminals (102) may access the contents stored on the CDN servers via one or more data communication networks, such as for example the Internet (not represented in the figure).

Content received by the transcoder subsystem 103 may be uncompressed or very lightly compressed. For example, the transcoder subsystem 103 may be configured to receive uncompressed video content which may be transported using a data communication link suitable for carrying raw video content, such as an SDI (Serial Digital Interface) link, a TSoIP (Transport Stream over IP) link or a HDMI (High-Definition Multimedia Interface) link. As illustrated in FIG. 2, uncompressed content may be provided to the transcoder subsystem 103 using a TSoIP link. A person of ordinary skill in the art would understand that any type of link suitable for transporting uncompressed or very lightly compressed video content may be used in place of the TSoIP links of FIG. 2, which are provided as an example only.

The transcoder subsystem 103 may be configured for encoding/compressing received channels in live mode, that is, as they are received, and to also output encoded channels in live mode, that is, as they are produced.

As illustrated on FIG. 2, in one or more embodiments the transcoder subsystem 103 comprises one or more transcoding servers, which may comprise one or more encoding and/or transcoding engines, also referred to in the following as source encoders. These one or more servers are preferably configured for encoding content (such as video content and/or audio content) for each "Live Channels" received by the transcoder subsystem 103. In some embodiments the servers may be configured for encoding in real-time different types of content (for example different types of video content) at corresponding transcoding points along the transcoding workflow.

Content output by the transcoder subsystem 103 to the packager subsystem 104 may be transported using a data communication link suitable for carrying compressed video content, such as for example a Multi Bitrate Transport Stream (MBTS) link as illustrated on FIG. 2. In one or more embodiments, the media stream output to the packager subsystem 104 may be a media stream supporting low-latency, that is, a media stream which is configured for use in media distribution systems supporting low-latency. Such a media stream may carry information indicating a chunk structure, in addition to carrying information indicating a fragment structure, and/or a segment structure in addition to carrying media data.

A person of ordinary skill in the art would understand that any type of network suitable for providing fast delivery of Internet content, such as video content, may be used in place of the CDN 105 of FIG. 2, which is provided as an example only, and that any format suitable for transmission of multimedia content, such as video content, with very low latency, may be used, such as the CMAF (Control Media Application Format) format, which is provided as an example only. Using a CDN advantageously allows leveraging the existing CDN infrastructure, whether public or private, for data communication between the packager 104 of the system and a terminal 102 (which may for example be a player embedded in a computer, a smartphone or a tablet at a users' site).

A "pull"-type data communication mechanism may typically be used for data communication between the transcoder 103 and the packager 104, and between the terminal 102 and the packager 104 through the CDN 105, according to which the packager 104 (respectively the terminal 102) may request data from the transcoder 103 (respectively the packager 104) as it is ready to receive such data (through the CDN for the terminal 102). In this case, data communication would be guided by the packager 104 (respectively the terminal 102) instead of the transcoder 103 (respectively the packager 104).

The packager 104 may typically be configured for generating files suitable for corresponding media transport protocols and readable by the terminal which requested the content. In an OTT distribution system, content generated by the packager may be referred to as OTT content, that is, content that may be distributed to terminals using data communication mechanisms used in OTT distribution, such as the HLS protocol, the MSS protocol, the HDS protocol and the MPEG DASH protocol.

Standard OTT packaging operates by generating and publishing as soon as possible, that is without waiting for a request for content, all contents for all OTT protocols.

Conventional orchestrations of streaming services are blind to audience measurement, even though audience measurement influence performances of some orchestration solutions. Therefore an improved orchestration solution may be obtained by being configured to be aware of this metric, possibly in addition to other metrics, such as video content complexity, in order to advantageously make a better use of computational resources, for example on a private or public cloud, and better exploit the codec elasticity.

An "orchestration software" (also referred to as an "orchestrator") is a software solution that can be used for deploying applications such as micro-services applications through various deployment possibilities in units of software that package up a code and its dependencies for running quickly and reliably on any computing environment. Orchestration software, such as Kubernetes, typically manage various aspects of the units of software, including the allocation of physical (hardware) resources (e.g. CPU, memory), network and service planning and automation. For example, an application executed through an orchestration software may be a video processing application program, such as a video encoding and/or decoding program, or a video transcoding program.

As video processing applications (e.g. video coding applications) may advantageously use an orchestration software solution, an orchestrator may advantageously be used in the transcoder 103 of FIG. 2.

In one or more embodiments, the orchestrator may further be configured to monitor one or more relevant parameters for one or more of the live channels that are being encoded, and calculate and dynamically apply, possibly in real-time, an optimal computational resource allocation for one or more of these channels.

Figure 3:
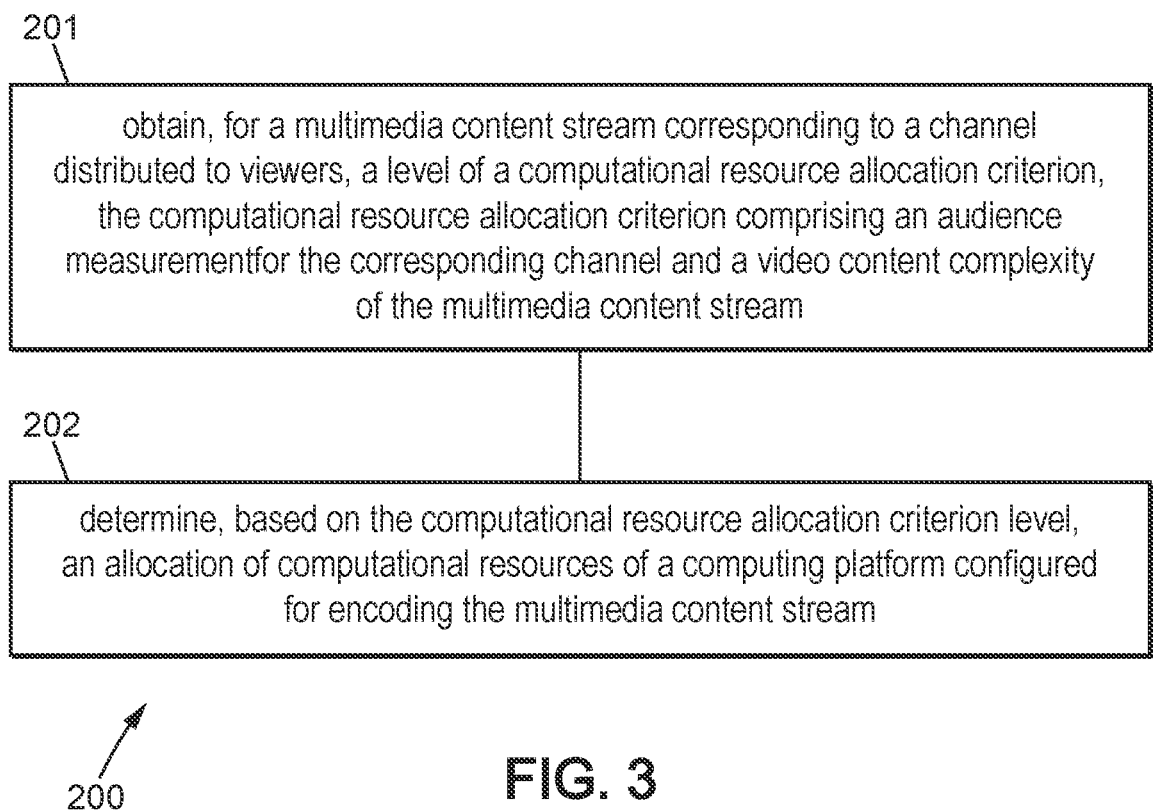
FIG. 3 is a block diagram illustrating an exemplary computational resource allocation method in accordance with one or more embodiments.

FIG. 3 is a block schematic diagram of a method (200) for managing computational resources according to embodiments of the present subject disclosure.

The exemplary method illustrated by FIG. 3 may advantageously be implemented on a computing platform comprised in a video processing node of a distribution network through which one or more multimedia content streams are distributed in dynamic mode, such as the exemplary transcoder 103 shown on FIG. 2.

One may therefore consider for implementation of embodiments of the proposed method a computing platform for processing one or more multimedia content streams distributed in dynamic mode to viewing devices. The computing platform may in some embodiments comprise a proposed resource management unit that may be configured to operate as part of or, depending on the embodiment, in combination with an orchestration software solution. The orchestration software may in some embodiments contain one or more clusters, each cluster comprising a cluster management node and one or more cluster computing nodes, with each cluster computing node comprising one or more cluster nodes. The proposed method may be implemented in a cluster of the orchestration software which comprises a cluster management node and at least one cluster node running a video processing application program, possibly comprised in a cluster computing node of the cluster. The proposed method may advantageously be implemented on a computational resource management unit, which may be implemented in software, hardware, or as a combination of software and hardware. In one or more embodiments, the proposed computational resource management unit may be implemented as a software program running on a server. Depending on the embodiment, the server on which the computational resource management unit is implemented may or not be distinct from a server on which the orchestration software is running, in which case the computational resource management unit may be configured with a data communication interface for data communication with the cluster management node of the orchestration software. In some embodiments, the computational resource management unit may be implemented as a software program running on the same server (e.g. a Linux server) as the one on which the orchestration software is running. In some embodiments in which the computational resource management unit and the orchestration software are configured to run on the same server (e.g. a Linux server), the computational resource management unit may be implemented as a software program running in the cluster node (e.g. a Kubernetes Pod) in which the video processing application program is running.

In one or more embodiments, the processing node of the distribution network may obtain (201), for a multimedia content stream corresponding to a channel distributed to viewers, a value of a computational resource allocation criterion. The computational resource allocation criterion may comprise an audience measurement for the channel and a video content complexity of the multimedia content stream.

Therefore, depending on the embodiment, the processing node of the distribution network may obtain, for at least one of the multimedia content streams distributed through the distribution network, a level of an audience measurement-based computational resource allocation criterion and a level of a video complexity of the multimedia content stream-based computational allocation criterion.

As a consequence, depending on the embodiment, a measured audience for the channel corresponding to the multimedia content stream may advantageously be monitored, through determination of a corresponding first computational resource allocation criterion level, so as to be taken into account for determining an allocation of computational resources of the computing platform. Further, a complexity level of video content of the multimedia content stream may also be determined, for example in real-time or near real-time, through determination of a corresponding second computational resource allocation criterion level, so as to also be taken into account for determining the allocation of computational resources of the computing platform. The computational resource allocation criterion determined for a multimedia content stream corresponding to a channel may therefore be multidimensional, with a first level related to measured audience for the channel and a second level related to video complexity of the multimedia content stream.

Based on the obtained level of the computational resource allocation criterion, the processing node may determine (202) an allocation of computational resources, for example an allocation of a determined number of CPU cores, for configuring the computing platform for encoding (e.g. transcoding) the multimedia content stream.

The proposed scheme therefore advantageously provides an audience and complexity aware orchestration for encoding at least one of one or more multimedia content streams that are distributed in dynamic mode to viewing devices through a distribution network, such as for example an OTT multimedia streaming network. Monitoring audience of the corresponding channel distributed to viewers as well as complexity of the stream corresponding to the channel advantageously allows dynamically adjusting the computational resources of the computing platform used for encoding (e.g. transcoding) content of the multimedia content stream based on two different types of criterion, one criterion exploiting the characteristics of the stream and another criterion being indifferent to intrinsic characteristics of the stream.

Therefore, in some embodiments, the processing node of the distribution network may obtain, for at least one of the multimedia content streams distributed through the distribution network, a level of a video content complexity-based computational resource allocation criterion and a level of an audience measurement-based computational resource allocation criterion.

As a consequence, in some embodiments, a measured audience for the channel corresponding to the multimedia content stream and a video content complexity of video content of the multimedia content stream may advantageously be monitored, through determination of both of corresponding computational resource allocation criterion levels, so as to be taken into account for determining an allocation of computational resources of the computing platform.

Based on the obtained levels of the computational resource allocation criterion (which is in such embodiments multiple or multidimensional), the processing node may determine an allocation of computational resources for configuring the computing platform for encoding (e.g. transcoding) the multimedia content stream.

The proposed scheme therefore advantageously provides, in some embodiments, an audience and content aware orchestration for encoding at least one of one or more multimedia content streams that are distributed in dynamic mode to viewing devices through a distribution network, such as for example an OTT multimedia streaming network. Monitoring audience of the corresponding channel distributed to viewers, and monitoring complexity of the video content of the multimedia content stream advantageously allows dynamically adjusting the computational resources of the computing platform used for encoding (e.g. transcoding) content of the multimedia content stream based on measured audience for the channel and complexity of the video content of the stream.

In one or more embodiments, the proposed method may further comprise: configuring the computing platform based on the determined allocation of computational resources, and encoding, by the configured computing platform, the multimedia content stream.

In some embodiments, the determination of the allocation of computational resources may be adapted to the computing platform which is to be used for encoding the multimedia content stream, and may therefore comprise assigning values to specific computational resource configuration parameters of such computing platform based on the determined allocation of computational resources. Advantageously, the parameters used to define the allocation of computational resources may be mapped to specific configuration parameters usable for defining the processing configuration of the computing platform.

Depending on the embodiment, the proposed method may be implemented in any suitable computing system configured for implementing the proposed method according to embodiments of the present subject disclosure. Depending on the embodiment, the computing system may be implemented in hardware, software, firmware, middleware, microcode, or any suitable combination thereof. Further, depending on the embodiment, some or all of the parts of the computing system that are implemented in software may be configured to run in the cloud or, alternatively, on premises (e.g. on a server which is not cloud-based).

In one or more embodiments, distributing the multimedia content stream, for example using the exemplary distribution network of FIG. 2, may comprise processing the multimedia content stream, for example for purposes of encoding content of such multimedia content stream, at a processing node of the distribution network, such as the exemplary transcoder 103 shown on FIG. 2.

In one or more embodiments, the computational resource allocation scheme proposed for a multimedia content stream distributed in dynamic mode through a distribution network may be applied to several multimedia content streams distributed in dynamic mode through the distribution network.

In such embodiments, the processing node of the distribution network may be configured to obtain respective computational resource allocation criterion levels for a plurality of multimedia content streams respectively corresponding to channels in a plurality of channels distributed to viewers. In some embodiments, a respective computational resource allocation criterion level may be obtained by the processing node for each multimedia content stream of a plurality of multimedia content streams distributed in dynamic mode to viewing devices through the distribution network (for example an OTT multimedia streaming network). Depending on the embodiment, the respective computational resource allocation criterion level may comprise a respective complexity level of the video content of the corresponding multimedia content stream, and an audience measurement level of the channel corresponding to the multimedia content stream.

The plurality of respective computational resource allocation criterion levels respectively corresponding to the plurality of multimedia content streams may be used for determining a computational resource configuration of the computing platform, which computational resource configuration may comprise respective allocations of computational resources of the computing platform for encoding (e.g. transcoding) respective contents of the respective multimedia content stream MCS_k.

The proposed scheme may therefore advantageously allow determining an improved computational resource configuration of a computing platform configured for encoding a plurality of multimedia content streams MCS_k for distribution in dynamic mode to viewing devices through a distribution network, in that the computational resource configuration may be, depending on the embodiment, audience and content complexity aware with respect to the plurality of multimedia content streams.

In one or more embodiments, the proposed method may further comprise selecting, based on the respective computational resource allocation criterion levels, a multimedia content stream in the plurality of multimedia content streams for which a respective computational resource allocation criterion level has been obtained. The processing node may then determine an allocation of computational resources of the computing platform for processing (e.g. encoding) the selected multimedia content stream. Selecting a specific multimedia content stream advantageously allows handling dynamic computational resource allocation for one stream, instead of a plurality of streams, or for a selection of streams among the plurality of streams, instead of all the streams of the plurality of streams, in implementations that may provide monitoring of a plurality of streams through determination of an channel audience-based and video content complexity-based criterion, and dynamically adjusting computational resources allocated to a selection of those streams for which an update is considered beneficial and/or necessary.

Therefore, in some embodiments, the dynamic determination of the computational resource configuration of the computing platform may comprise dynamically updating the computational resources of the processing platform allocated to the processing of a multimedia content stream based on, depending on the embodiment, a respective computational resource allocation criterion level obtained for this multimedia content stream, or based on a plurality of respective computational resource allocation criterion level obtained for a plurality of multimedia content streams including the multimedia content stream.

In one or more embodiments, an audience measurement level for a channel corresponding to a multimedia content stream may be obtained through any suitable audience measurement algorithm providing one or more audience measurements metrics for the channel corresponding to the multimedia content stream.

For example, in some embodiments, a measurement of the number of users who are watching a channel corresponding to the multimedia content stream may be obtained, for example through a real-time or near real-time suitable channel audience measurement application programming interface (API).

As another example, in some embodiments, further audience measurement information, such as including a measurement of a number of active viewers, with types of device used by such active viewers, and amount of time spent by such active viewers per device type, may be obtained through a suitable channel audience measurement API.

In one or more embodiments, the computational resource allocation criterion is multidimensional and comprises a video content complexity of video content of a multimedia content stream in addition to an audience measurement for the corresponding channel. An analysis of the content of a multimedia content stream may therefore also be performed (e.g. in real time or near real-time) in order to determine a level of a video content complexity of the video content of the multimedia content stream. In some embodiments, any suitable video analysis of the video content of the multimedia content stream may be used to determine the video content complexity level of the multimedia content stream.

For example, in some embodiments, a motion analysis may be performed on the video content of the multimedia content stream. In one or more embodiments, a multimedia content complexity level may be obtained for a multimedia content stream by determining a score that represents the amount of motion present in the video content of the multimedia content stream.

For example, in some embodiments, the video encoder that is used for encoding the multimedia content stream may be configured to generate as output data an estimated bitrate that would correspond to a given video quality (e.g. measured through a corresponding distortion). A multimedia content complexity level may be determined for the multimedia content stream based on such estimated bitrate as the more complex the video content of the multimedia content stream, the higher the bitrate. For example, a plurality of multimedia content complexity levels may be predefined and a mapping to bitrate level may also be defined, so that for example a lookup table may be used to determine a complexity level based on the bitrate estimated by the video encoder for encoding the multimedia content stream.

In some embodiments, a look-ahead buffer may be used by the video encoder configured for encoding frames (images) of the multimedia content stream for buffering a predefined number of frames to be encoded before encoding such frames. A suitable analysis may for example advantageously be performed on one or more frames stored in the look-ahead buffer in order to obtain a complexity level for such frames. In such embodiments, a complexity level may be obtained for one or more frames stored in the look-ahead buffer, for example based on a bitrate estimated by the video encoder for these frames before encoding such frames.

In one or more embodiments, a video encoder configured for encoding one or more multimedia content streams for distribution in dynamic mode to viewing devices, may be configured to dynamically update its configuration based on the capacity of the computing platform on which the encoder is implemented and the current load of such platform. Given the real-time constraint of live distribution of multimedia content streams, the configuration of the video encoder, including the computational resources of the computing platform allocated to the encoding of multimedia content streams, may be dynamically updated, in particular upon changes of the overall load of the computing platform.

The present subject disclosure provides a computational resource management method that advantageously takes into account both audience measurements for a channel and video content complexity in the allocation of computational resources of a computing platform configured for encoding video content of a multimedia content stream according to one or more embodiments. A computational resource management method is also proposed that advantageously takes into account both respective channel audience measurements and respective video content complexities in the allocation of computational resources of a computing platform configured for encoding respective video contents of a plurality of multimedia content streams according to one or more embodiments.

Advantageously, audience measurements may provide information as to how many viewers are watching each of a plurality of channels respectively corresponding to multimedia content streams distributed in dynamic mode, as a live channel may be watched more than another. In one or more embodiments, such information may be taken into account in the allocation of computational resources to the encoding of corresponding multimedia content streams on the computing platform used for such encoding.

In some embodiments, a level of an audience measurement criterion may be taken into account in the allocation of computational resources of a computing platform configured for encoding a multimedia content stream.

In some embodiments, a level of a video content complexity (as measured in real-time or near real-time for video content corresponding to a live channel) criterion is also taken into account in the allocation of computational resources of a computing platform configured for encoding a multimedia content stream. That is, in some embodiments, both a level of a video content complexity criterion and a level of a video content complexity criterion may be taken into account in the allocation of computational resources of a computing platform configured for encoding a multimedia content stream.

In one or more embodiments, the computational resources of a computing platform may be dynamically updated by determining a computational resource allocation that reduces the overall bitrate while maximizing the video quality (e.g., reducing the distortion).

In some embodiments, a computational resource configuration of the computing platform may be determined as a computational resource configuration that minimizes an overall bitrate of a plurality of multimedia content streams after encoding while maximizing the video quality by minimizing the distortion incurred by encoding the plurality of multimedia content streams. In some embodiments, a computational resource configuration of the computing platform may be determined as a computational resource configuration that minimizes an overall bitrate of a plurality of multimedia content streams after encoding while maximizing a quality of experience for channels corresponding to the plurality of multimedia content streams. In embodiments of the present subject disclosure, the computational resource configuration may advantageously be determined by taking into account respective levels of video content complexity criteria and respective levels of audience measurement for corresponding channels criteria determined for the multimedia content streams.

Depending on the embodiment, different cost functions J of the form $J=R+\lambda \cdot D$, where D is a distortion measurement, $\lambda$ is a Lagrangian parameter, and R is an overall bitrate measurement may be considered, examples of which are described below. Depending on the embodiment, the Lagrangian parameter may be configured to put more or less constraints on the video distortion. Therefore, an allocation of computational resources of one or more channels may be updated by determining which allocation to a given channel enables reaching a lower overall bitrate while maintaining or improving the video quality (e.g. measured by a video distortion criterion) and/or quality of experience of the channel (e.g. measured by an average of the quality of experience of a plurality of viewers of the channel).

In one or more embodiments, the optimum computational resource configuration may be determined by optimizing (e.g. in some embodiments minimizing) a cost function $J1=R1+\lambda \cdot D$, where D is a distortion measurement, $\lambda$ is a Lagrangian parameter, and R1 is an overall bitrate measurement.

In some embodiments, the overall bitrate R1 may be determined as $R1=\Sigma_{i=1}^{N} b_i \cdot v_i$, where N is a number of channels, $b_i$ is an output bitrate of an encoded multimedia content stream corresponding to a channel of index i, $v_i$ is an audience measurement for the channel of index i (for example $v_i$ corresponds to the number of viewers of the channel of index i).

In some embodiments, the distortion D may be determined based on $(d_i)_{i=1, \ldots, N}$, where $d_i$ is a distortion measurement of the channel of index i, and on $(v_i)_{i=1, \ldots, N}$, where $v_i$ is an audience measurement for the channel of index i (for example $v_i$ corresponds to the number of viewers of the channel of index i).

In some embodiments, the distortion D may be determined as $D=\Sigma_{i=1}^{N} v_i \cdot d_i$, where $v_i$ is an audience measurement for the channel of index i and $d_i$ is a distortion measurement of the channel of index i.

Therefore, in some embodiments, the cost function to be determined (for example to be optimized (e.g. in some embodiments minimized)) may be as follows:

$$J1 = \sum_{i=1}^{N} \{b_i \cdot v_i + \lambda \cdot v_i \cdot d_i\}$$

In one or more embodiments, the optimum computational resource configuration may be determined by optimizing (for example in some embodiments minimizing) a cost function $J2=R2+\lambda \cdot D$, where D is a distortion measurement, $\lambda$ is a Lagrangian parameter, and R2 is an overall bitrate measurement.

In some embodiments, the overall bitrate R2 may be determined as $R2=\Sigma_{i=1}^{N} b_i(1+v_i)$, where N is a number of channels, $b_i$ is a bitrate of an encoded multimedia content stream corresponding to a channel of index i, $v_i$ is an audience measurement for the channel of index i (for example $v_i$ corresponds to the number of viewers of the channel of index i).

In some embodiments, the distortion D may be determined based on $(d_i)_{i=1,\ldots,N}$, where $d_i$ is a distortion measurement of the channel of index i, and on $(v_i)_{i=1,\ldots,N}$, where $v_i$ is an audience measurement for the channel of index i (for example $v_i$ corresponds to the number of viewers of the channel of index i).

In some embodiments, the distortion D may be determined as $D=\Sigma_{i=1}^{N} v_i \cdot d_i$, where $v_i$ is an audience measurement for the channel of index i and $d_i$ is a distortion measurement of the channel of index i.

Therefore, in some embodiments, the cost function to be determined (for example to be optimized (e.g. in some embodiments minimized)) may be as follows:

$$J2 = \sum_{i=1}^{N} \{b_i \cdot (1 + v_i) + \lambda \cdot v_i \cdot d_i\}$$

In one or more embodiments wherein the multimedia content streams are distributed over a distribution network which comprises a content delivery network, CDN, the optimum computational resource configuration may be determined by optimizing (for example in some embodiments minimizing) a cost function $J3=R3+\lambda \cdot D$, where D is a distortion measurement, $\lambda$ is a Lagrangian parameter, and R3 is an overall bitrate measurement.

In some embodiments, the overall bitrate R3 may be determined as $R3=\Sigma_{i=1}^{N} b_i \cdot (\Sigma_{j=1}^{M} k_j + v_i)$, where N is a number of channels, $b_i$ is a bitrate of an encoded multimedia content stream corresponding to a channel of index i, $v_i$ is an audience measurement for the channel of index i, M is a number of regions in the CDN, and $k_j$ is a weight value of index j assigned to an edge cache used by the channel of index i, where $d_i$ is a distortion measurement of the channel of index i (for example $v_i$ corresponds to the number of viewers of the channel of index i).

In some embodiments, the distortion D may be determined based on $(d_i)_{i=1,\ldots,N}$, where $d_i$ is a distortion measurement of the channel of index i, and on $(v_i)_{i=1,\ldots,N}$, where $v_i$ is an audience measurement for the channel of index i (for example $v_i$ corresponds to the number of viewers of the channel of index i).

In some embodiments, the distortion D may be determined as $D=\Sigma_{i=1}^{N} v_i \cdot d_i$, where $v_i$ is an audience measurement for the channel of index i and $d_i$ is a distortion measurement of the channel of index i.

Therefore, in some embodiments, the cost function to be determined (for example to be optimized (e.g. in some embodiments minimized)) may be as follows:

$$J3 = \sum_{i=1}^{N} \left\{ b_i \cdot \left( \sum_{j=1}^{M} k_j + v_i \right) + \lambda \cdot v_i \cdot d_i \right\}$$

Depending on the embodiment, the distortion measurement D used in the cost function may be determined based on a video quality for one or more channels (for example determined based on a distortion measurement for one or more channels), and/or a Quality of Experience (QoE) measurement for one or more channels.

The QoE associated with a multimedia content stream may in some embodiments be determined based on an average of the quality of experience of all of the viewers of the channel corresponding to the multimedia content stream. The QoE associated with a plurality of multimedia content streams may in some embodiments be determined based on an average of respective qualities of experience of the channels corresponding to the multimedia content streams. The QoE of a viewer may for example be determined based on a number of packet loss and/or a frequency and duration of video freeze experienced by the viewer. In some embodiments, one or more of QoE per viewer parameter (including a number of packet loss and/or a frequency and duration of video freeze experienced by the viewer) may be measured and reported to a computational resource management unit in real-time or near real-time by any suitable client instrumentation software.

Therefore, in some embodiments, the distortion D' used in the cost function $J'_k = R_k + \lambda \cdot D'$ (with k=1, 2, or 3 and $R_k$ being the overall bitrate, for example determined as described in the above-described exemplary embodiments) to be determined (for example to be optimized (e.g. in some embodiments minimized)) may be as follows:

$$D' = v_i \cdot w_i, \text{ with } w_i = \alpha \cdot d_i + \beta \cdot \frac{1}{QoE_i},$$

where $d_i$ is a distortion measurement of the channel of index i, and $QoE_i$ is an average quality of experience of viewers of the channel of index i. $\alpha$ and $\beta$ are weight parameters which may be defined to give more or less weight to each of the video quality (measured by $d_i$) and the quality of experience each channel i. For example, a weight value $\alpha=0$ may be defined to only use the QoE, while a weight value $\beta=0$ may be defined to only use the video quality.

In one or more embodiments, if a given channel is reported to be experiencing an increase of packet loss and/or an increase of video freezes, that is, the quality of experience of viewers of a given channel is decreasing, for example due to greater bandwidth constraints, a new optimum computational resource allocation can be determined, in which more computational resources are allocated to such channel.

As a consequence of allocating increased computational resources to a channel for which the QoE of viewers is decreasing, the compression efficiency is advantageously improved, and the bitrate of the encoded stream is reduced. The lower bitrate, in turn, advantageously results in fewer congestion on the network links that may experience bottleneck and therefore less packet loss and video freezes.

In one or more embodiments, the quality of experience perceived by one or more of the viewers of the channel of index i may be determined based on one or more parameters, each representing metric values provided by video players used by viewers watching the channel of index i and that can be used for computing a QoE value for the channel i.

Depending on the embodiment, the following QoE metrics may be used, whether alone or in combination, with respect to a given channel:

timeToStart: average of time taken by each player to start the playback (in seconds);
rebufferingDuration: average of rebuffering time for all viewers of the channel (in seconds);
Latency: average of latencies to get the frame for all viewers of the channel (in seconds);
playbackStartFailure: number of failed playback attempts;
frameDrop: average number of dropped frames for all viewers of the channel;

rebufferingFrequency: average of rebuffering frequency for all viewers of the channel.

Therefore, in some embodiments, the Quality of Experience, QoE, measurement for a channel is determined based on one or more of the following QoE metrics: average of time taken by each player to start the playback; average of rebuffering time for all viewers; average of latencies to get the frame for all viewers of the channel; number of failed playback attempts; average number of dropped frames for all viewers of the channel; and average of rebuffering frequency for all viewers of the channel.

In some embodiments, a weighted combination of the above QoE metrics may be used to compute an average quality of experience of viewers of the channel of index i:

$$QoE_i = (a_0 + a_1 * timeToStart +$$
$$a_2 * rebufferingDuration + a_3 * \text{Latency} + a_4 * playbackStartFailure +$$
$$a_5 * frameDrop + a_6 * rebufferingFrequency)^{-1}$$

where $a_i$ designates weights respectively applied to the different QoE metrics, except for $a_0$ which is a predetermined constant.

In an exemplary use case in which a weighted combination of the 6 exemplary QoE metrics described above are use, the respective weights may be chosen as follows:

$a_1$: 2
$a_2$: 5
$a_3$: 1
$a_4$: 1
$a_5$: 4
$a_6$: 10

In this exemplary use case, the quality of experience will be deemed low for computed QoE values that are near zero, the worse QoE corresponding to a value of 0. The best QoE will correspond to a value of $1/a_0$. The value of the constant $a_0$ may be chosen equal to 1, in which case $0 < QoE \leq 1$.

It will be appreciated by those having ordinary skill in the relevant art that any suitable QoE metric or combination of QoE metrics, may be used in place of any of the timeToStart, rebufferingDuration, Latency, playbackStartFailure, number of failed playback attempts, frameDrop, and rebufferingFrequency metrics, which are given by way of example only.

In particular, in embodiments in which player-level QoE metric measurements are not available, network performance metrics such as, for example, packet loss rate, network throughput, delay and jitter may advantageously be used to compute or estimate suitable QoE metrics.

FIGS. 4a-4c each illustrates an exemplary optimal computational resource allocation algorithm that may be used in one or more embodiments.

The proposed allocation algorithms may consider channels distributed to viewers that respectively correspond to multimedia content streams distributed in dynamic mode to viewing devices of these viewers through a distribution network. A computing platform configured with a set of computational resources may be configured for encoding the multimedia content streams for distribution of the encoded streams in dynamic mode through the distribution network. The set of computational resources may comprise a number TotalCPUs of CPU cores to be allocated to the distributed channels.

In one or more embodiments, the allocation algorithms may be configured to allocate all of the computational resources of the computing platform, in order to fully take advantage of such computational resources for the encoding of the streams. For example, the algorithms may be configured to allocate all of the TotalCPUs CPU cores to the distributed channels according to an optimum CPU core allocation.

FIGS. 4a-4c each illustrates an exemplary algorithm that may be used for computational resource allocation to distributed channels. The exemplary algorithms shown in FIGS. 4a-4c are of the greedy type (specifically, on the A-greedy type), as are designed for determining an allocation that uses a rate-distortion criterion $J_i = R_i + \lambda \cdot D_i$, where $D_i$ is a distortion measurement, $\lambda$ is a Lagrangian parameter, and $R_i$ is an overall bitrate measurement, and returns an optimal allocation of CPU cores to the channels. In some embodiments, the rate-distortion criterion used may correspond to one of the cost functions described above. In some embodiments, $R_i$ may be determined based on an audience measurement for the current channel and an estimate of gain in bitrate reduction obtained if the current channel is allocated additional computation resources for encoding the corresponding multimedia content stream. In some embodiments, $D_i$ may be determined based on a distortion measurement and an audience measurement for the current channel. Each of the exemplary algorithms of FIGS. 4a-4c executes iterations of a loop on disputed CPU cores, that is, on the $N_{cpus}$ CPU cores that are remaining to be allocated once minimum allocations have been performed for the channels. At each iteration of the loop, the algorithm performs the allocation of the CPU core to be allocated at that iteration to the channel that provides the most important decrease of the respective rate-distortion criterion $J_i$ used in the algorithm.

A person of ordinary skill in the art would understand that any algorithm or type of algorithm suitable for determining a computational resource allocation based on audience measurement, may be used in place of the algorithms of FIGS. 4a-4c, which are provided as examples only. In particular, a greedy-type algorithm may be used with a suitable rate-distortion criterion $J_i$ corresponding to a cost function to be optimized (e.g. in some embodiments minimized) which is different from the rate-distortion criterion used in each of the algorithms of FIGS. 4a-4c, which corresponds to one of the cost function described above.

As shown in FIGS. 4a-4c, in one or more embodiments, each channel may first be configured according to an initial computational resource allocation configuration, which in some embodiments be determined based on a configuration of the channel: allocation[channels]←min_allocation[channel_config].

The initial computational resource allocation configuration may be predefined to provide each channel with a minimum computational resource allocation required to ensure operation of the channel given corresponding constraints (e.g. real-time or near-real time constraints).

For example, the minimum computational resource allocation for a channel may be determined based on a channel configuration, comprising values of parameters such as type of codec, resolution, frame rate, etc.: min_allocation[channel_config]. Therefore a minimum computational resource allocation defined based on a channel configuration min_allocation[channel_config] may be used to initially configure the channel. In some embodiments, the minimum allocation for a channel min_allocation may be defined as the minimum number of CPU cores that need to be guaranteed to the channel for the multimedia content stream corresponding to the channel to be encoded using the channel configuration.

In some embodiments, once the minimum allocations have been performed for each of the channels, the remaining $N_{cpus}$ CPU cores may then be allocated in order to provide an optimum allocation in which each channel is provided with the CPU core resources that will result in a maximum bitrate gain for the channel.

For example, as illustrated by FIGS. 4a-4c, an allocation of the $N_{cpus}$ CPU cores to the distributed channels may be performed using a CPU core allocation loop, an iteration of which may be performed for each core c of the $N_{cpus}$ cores.

For each iteration of the CPU core allocation loop performing allocation of the core c, a channel allocation loop may be performed, an iteration of which may be performed for each channel channel in the distributed channels to which one or more CPU cores of the $N_{cpus}$ cores are to be allocated.

Therefore, in one or more embodiments, the proposed method may further comprise: perform one or more iterations of a channel allocation loop, wherein an iteration of index i comprises, for a current channel of the plurality of channels: determine for the current channel a respective channel gain based on a rate-distortion criterion $J_i = R_i + \lambda \cdot D_i$, where $D_i$ is a distortion measurement, $\lambda$ is a Lagrangian parameter, and $R_i$ is an overall bitrate measurement, wherein $R_i$ is determined based on an audience measurement for the current channel and an estimate of gain in bitrate reduction obtained if the current channel is allocated additional computation resources for encoding the corresponding multimedia content stream, and wherein $D_i$ is determined based on a distortion measurement and an audience measurement for the current channel.

Each of FIGS. 4a-4c provides an example of a different rate-distortion criterion $J_i = R_i + \lambda \cdot D_i$ that may be used for allocation of computational resources for the encoding of the channels.

As illustrated by FIG. 4a, the parameter $R_i$ may be determined based on a product of $v_i$ with the estimate of gain, wherein $v_i$ is an audience measurement for the current channel.

In other embodiments, the parameter $R_i$ may be determined based on a product of $(1+v_i)$ with the estimate of gain, wherein $v_i$ is an audience measurement for the current channel.

As illustrated by FIGS. 4b and 4c, in some embodiments wherein the distribution network comprises a content delivery network, CDN, the parameter $R_i$ may be determined based on a product of $(\Sigma_{j=1}^{M} k_j + v_i)$ with the estimate of gain, wherein $v_i$ is an audience measurement for the current channel, M is a number of regions in the CDN, and $k_j$ is a weight value of index j assigned to an edge cache used for distribution of the current channel in the CDN.

In one or more embodiments, the distortion measurement of $D_i$ may be determined based on $d_i$, a distortion measurement for the current channel, and/or $QoE_i$, a Quality of Experience measurement for the current channel.

For example, as illustrated by FIG. 4c, in some embodiments, the distortion $D_i$ used in the rate-distortion criterion (for example $J' = Rk + \lambda \cdot D_i$ (with k=1, 2, or 3 and Rk being the overall bitrate, for example determined as described in the above-described exemplary embodiments) may be as follows:

$$D_i = v_i \cdot w_i, \text{ with } w_i = \alpha \cdot d_i + \beta \cdot \frac{1}{QoE_i},$$

where $d_i$ is a distortion measurement of the channel of index i, and $QoE_i$ is an average quality of experience of viewers of the channel of index i. $\alpha$ and $\beta$ are weight parameters which may be defined to give more or less weight to each of the video quality (measured by $d_i$) and the quality of experience each channel i. For example, a weight value $\alpha=0$ may be defined to only use the QoE, while a weight value $\beta=0$ may be defined to only use the video quality.

In one or more embodiments, the distortion measurement of $D_i$ may be determined based on the Quality of Experience measurement for the channel of index i $QoE_i$, and the Quality of Experience, QoE, measurement for the channel of index i is determined based on one or more of the following QoE metrics: average of time taken by each player to start playback; average of rebuffering time for all viewers; average of latencies to get the frame for all viewers; number of failed playback attempts; average number of dropped frames for all viewers of the channel; and average of rebuffering frequency for all viewers of the channel.

In one or more embodiments, the iteration of the channel allocation loop for the channel channel may comprise the following operations:

A current CPU core allocation for the channel current_alloc variable corresponding to the number of CPU cores currently allocated to the channel (number of CPU cores currently allocated for encoding the corresponding multimedia content stream) may be updated with the minimum computational resource allocation allocation[channel] previously determined for the channel: current_alloc←allocation[channel].

In some embodiments, a bitrate (which corresponds to the bitrate of the output stream output by the video encoder) gain (for example expressed as a BDRate gain, as illustrated by FIG. 1b) that would be achieved by allocating an additional CPU core may be determined for the channel channel. In embodiments, the bitrate gain for the channel may be determined as the estimated gain for the channel that would be obtained when increasing the number of CPU cores currently allocated for encoding the corresponding multimedia content stream current_alloc by one.

As illustrated by FIG. 1b, the bitrate gain, expressed as a BDRate gain, may differ depending on the number of CPU cores already allocated to a channel. For example, for each of the 6 video test sequences of FIG. 1b, the respective BDRate gain achieved by using one additional CPU core for encoding a test video sequence differs for an increase from 5 to 6 CPU cores and from an increase from 11 to 12 CPU cores.

In one or more embodiments, the bitrate gain may be determined by measurement of the gain obtained when increasing the number of CPU cores allocated for encoding the corresponding multimedia content stream by one.

In one or more embodiments, a prediction of the bitrate gain predicted_bitrate_gain may be obtained using a supervised learning algorithm (or any suitable machine learning algorithm) implemented by a neural network. In some embodiments, the predicted_bitrate_gain may be a value estimated by a machine learning bitrate gain model.

As illustrated in FIG. 4a, in one or more embodiments, a gain function gain[channel] to be maximized for the channel channel may be determined as:

gain[channel]←$v_i$·predicted_bitrate_gain(current_alloc)+$\lambda \cdot (v_i \cdot d_i)$ where $v_i$ is an audience measurement for the channel of index i, and $d_i$ is a distortion measurement of the channel of index i.

As illustrated in FIG. 4b, in one or more embodiments, a gain function gain[channel] to be maximized for the channel channel may be determined as:

gain[channel]←($v_i+\Sigma_{j=1}^{M}k_j$)·predicted_bitrate_gain (current_alloc)+$\lambda$·($v_i·d_i$)

where $v_i$ is an audience measurement for the channel of index i, M is a number of regions in a CDN used for distributing the channels, $k_j$ is a weight value of index j assigned to an edge cache used by the channel of index i, and $d_i$ is a distortion measurement of the channel of index i.

As illustrated in FIG. 4c, in embodiments in which the video quality as well as the quality of experience are to be maximized, a gain function gain[channel] to be maximized for the channel channel may be determined as:

gain[channel]←($v_i+\Sigma_{j=1}^{M}k_j$)·predicted_bitrate_gain (current_alloc)+$\lambda$·($v_i·w_i$)

where $v_i$ is an audience measurement for the channel of index i, M is a number of regions in a CDN used for distributing the channels, $k_j$ is a weight value of index j assigned to an edge cache used by the channel of index i, $d_i$ is a distortion measurement of the channel of index i, and:

$$w_i = \alpha \cdot d_i + \beta \cdot \frac{1}{QoE_i}$$

where $d_i$ is a distortion measurement of the channel of index i, $QoE_i$ is an average quality of experience of viewers of the channel of index i, and $\alpha$ and $\beta$ are weight values.

In some embodiments, the iteration of the channel allocation loop performed for the channel channel may end (End For) after determination of the gain for the current channel.

As illustrated by FIGS. 4a-4c, in some embodiments, a maximum gain argmax(gain) may be determined among the respective gains estimated for each channel by running iterations of the channel allocation loop, and the channel corresponding to the maximum gain may be selected (chosen_channel).

The iteration of the CPU core allocation loop performing allocation of the core c may then be completed by allocating an additional CPU core (corresponding to the CPU core c) to the selected channel:

allocation[chosen_channel]←allocation[chosen_channel]+1

As illustrated by FIGS. 4a-4c, in some embodiments, the iteration of the CPU core allocation loop performed for the core c may end once the core c has been allocated to the selected channel (End For).

The CPU core allocation loop may therefore be completed once all of the $N_{cpus}$ CPU cores have been allocated to selected distributed channels.

In one or more embodiments, the estimate of gain in bitrate reduction used in the allocation algorithm may be determined based on a prediction of bitrate gain predicted_bitrate_gain(current_alloc), which may in some embodiments be determined using a machine learning algorithm.

Therefore, in one or more embodiments, a machine learning algorithm (e.g. a supervised learning algorithm) may be used for determining a prediction of the bitrate gain to be obtained when allocating one more CPU cores for encoding the multimedia content stream corresponding to a given channel.

Using a machine learning algorithm advantageously avoids the need for computing the gain (e.g. the bitrate gain) to be expected when increasing the number of CPU cores allocated for encoding the multimedia content stream corresponding to the channel, which is particularly advantageous in embodiments in which the gain estimate is to be computed in real-time or near real-time, for example in the context of live distribution of the multimedia content streams. Further, a larger number of computational resource allocation parameters can advantageously be taken into account for purposes of determining a prediction of the bitrate gain, thereby providing a more optimized computational resource allocation configuration for encoding the corresponding multimedia content stream.

In some embodiments, the machine learning algorithm may be configured to predict the gain (e.g. the bitrate gain) that may be expected when allocating an additional CPU core to the encoding of a multimedia content stream corresponding to a channel while maintaining a current video quality for the channel.

Embodiments of the proposed method which use machine learning algorithms may advantageously use a supervised learning algorithm, which is trained during a training phase and then executed during an inference phase. In some embodiments, the machine learning algorithm is a supervised learning algorithm, and the proposed method further comprises: perform a training phase for training the supervised learning algorithm during which the supervised learning algorithm is trained with training data.

In one or more embodiments, the following bitrate gain prediction model that may be used for estimating the bitrate gain if an additional CPU core is allocated to a given channel, may be defined as follows:

In some embodiments, the machine learning algorithm may be configured to receive input data corresponding to one or more of the following input data parameters:

Current CPU allocation (e.g. in an "Integer" format);
Current video quality (e.g. in an "Float" format);
Estimated complexity (e.g. in an "Integer" format);
Video content frame width (e.g. in an "Integer" format);
Video content frame height (e.g. in an "Integer" format);
Video content frame rate (e.g. in an "Integer" format);
Video content: Interlaced or Progressive (e.g. in a "Boolean" format);
Type of encoder (e.g. among MPEG2, AVC, HEVC, AV1, etc.): for example coded by a hot array, or a bitmap, that is, a table filled with Boolean values set to zero except for one indicating the type of encoder.

That is, in some embodiments, parameters used for input data provided to the machine learning algorithm may correspond to a first category of parameters that may vary for a given channel, such as including one or more of computation resource allocation parameters (current CPU allocation (e.g. number of allocated CPU cores), current video quality, and estimated complexity), and to a second category of parameters that may not vary for a given channel, such as including one or more of video content characteristics (Frame width; Frame height; Frame rate; Interlaced or Progressive), and type of encoder.

Preferably, parameters used for input data provided to the machine learning algorithm may be chosen among parameters that are known to impact the quality gain obtained when increasing the amount of computational resources allocated to a channel. For example, the bitrate gain obtained when increasing the number of CPU cores allocated to the encoding of a video sequence is known to be highly correlated to the required video quality: for a given video sequence, the gain achieved when increasing the number of CPU cores allocated to the encoding of the video sequence is higher in cases where the required video quality is also high.

For example, the input data provided to the machine learning algorithm may comprise the following machine learning model input parameter values:

| | |
|---|---|
| Actual CPU Allocation | 6 |
| Actual Video Quality | 44.32 |
| Estimated Complexity | 8.10 |
| Frame width | 1920 |
| Frame height | 1080 |
| Frame rate | 24 |
| Interlaced | False |
| ... | |
| MPEG2 | 0 |
| AVC | 0 |
| HEVC | 1 |
| AV1 | 0 |

In some embodiments, the machine learning algorithm may be configured to generate output data comprising an integer value that represents a bitrate gain or a bitrate value (expressed in bit/s or in kbps).

In some embodiments, the supervised learning algorithm may be trained through a training phase during which the algorithm is provided with input training data comprising input data as described above as well as corresponding bitrate gain previously calculated. The training data may be defined based on a set of training multimedia content streams constituting a training dataset, each of which may be encoded through live encoding with encoding parameters such as one or more of the parameters of the exemplary set of parameters described above: (1) computation resource allocation parameters (current CPU allocation (e.g. number of allocated CPU cores); current video quality; estimated complexity); (2) video content characteristics (Frame width; Frame height; Frame rate; Interlaced or Progressive); and (3) Type of encoder (e.g. among MPEG2, AVC, HEVC, AV1, etc.).

In some embodiments, the machine learning algorithm may be a supervised learning algorithm, which is trained on a large number of training video sequences.

Advantageously, the training multimedia content streams may be chosen with different video content complexity. Using training video sequences which have different video complexities allows training the supervised learning algorithm with training sequences that advantageously corresponds well to channels that will be processed during an inference phase, the video content of which may have varying levels of video complexity.

In one or more embodiments, as the output of the machine learning algorithm is a numerical value, a regression model (e.g. a gradient boosting regression model) may advantageously be used in the machine learning algorithm. In some embodiments, a gradient boosting regression model which uses gradient boosted trees may be used in the machine learning algorithm. As illustrated by FIG. 1b, video sequences having different video complexities have different behaviors, and a video complexity spectrum may be determined in order to perform a regression. Therefore using a regression model is advantageously well adapted to the proposed scheme which also uses a regression. Similarly to a linear or polynomial regression, the regression model (e.g. the gradient boosting regression model) may be trained with a training dataset comprising a plurality (preferably a large number) of (input data, output data) combinations, for example of the type (Table input, output gain) corresponding to the exemplary data input and output data described above. In some embodiments, the gain (e.g. bitrate gain) used for generating the training dataset with respect to an input video sequence may be determined using relevant rate vs. distortion curves obtained for the sequence.

In embodiments that use a supervised learning algorithm, once the training of the algorithm is completed, and the trained algorithm provides satisfactory performances, the supervised learning may be used for producing an estimate of the gain (e.g. the bitrate gain) to be expected when increasing the number of CPU cores allocated for encoding the multimedia content stream corresponding to a given channel.

In one or more embodiments, the machine learning algorithm configured for predicting a gain (e.g. a bitrate gain) to be expected when increasing the allocation of computational resources for a given channel may use a gain prediction model which is trained using predetermined training data. In some embodiments, the machine learning algorithm may be further configured to use an online learning feature through which the gain prediction model is trained on an on-going basis, for example on a periodic basis, with new data generated during the inference phase (i.e. the operational phase) of implementing the machine learning algorithm with input data.

The machine learning algorithm may be configured, for a channel processed in real-time (or near real-time), that is, a corresponding multimedia content stream is encoded for live distribution in real-time (respectively near real-time), to generate data that are added to the initial input dataset for improving or furthering the training of the algorithm.

In embodiments in which an online learning feature is used, the input dataset may be managed using a sliding window (e.g. covering a few days or, depending on the implementation, a few weeks), in order to avoid over inflating such dataset and/or slowing down the execution time of the training of the algorithm.

By using an online learning feature for a continuous training of the machine learning algorithm, the machine learning algorithm advantageously continuously adapts to evolutions of the encoding scheme and/or application used for encoding (or, depending on the application, transcoding) the multimedia content streams. In addition, by using an online learning feature, the machine learning algorithm can advantageously become specialized in processing the type of multimedia content distributed by a content provider (for example the content provider of a sport channel or a movie channel).

Figure 5:
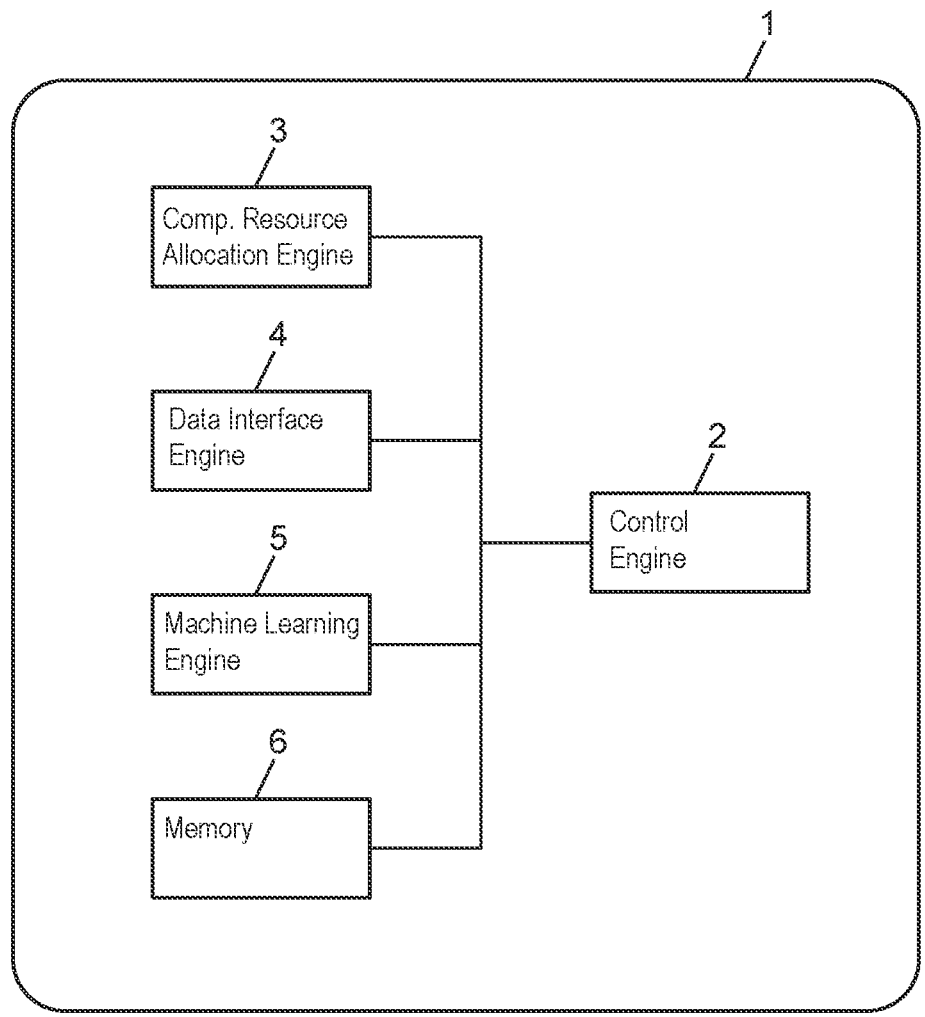
FIG. 5 illustrates an exemplary apparatus according to one or more embodiments.

FIG. 5 illustrates an exemplary apparatus 1 configured to use a computational resource allocation feature in accordance with embodiments of the present subject disclosure. The apparatus 1 may, depending on the embodiment, be comprised in a processing node of a multimedia content distribution network, in a server platform which comprises one or more servers (which may be cloud-based), or in a computational resource management unit of a processing node of a multimedia content distribution network, or of a server platform.

The apparatus 1, which may comprise one or more computers, includes a control engine 2, computational resource allocation engine 3, a data interface engine 4, machine learning engine 5, and a memory 6.

In the architecture illustrated on FIG. 5, all of the computational resource allocation engine 3, data interface engine 4, machine learning engine 5, and memory 6 are operatively coupled with one another through the control engine 2.

In one or more embodiments, the computational resource allocation engine 3 may be configured to perform various aspects of embodiments of the proposed method for computational resource allocation as described herein. In some embodiments, the computational resource allocation engine 3 may be implemented in software and incorporated in a computing machine running on a server and operating with an orchestration software (e.g. Kubernetes) according to embodiments of the present subject disclosure.

In some embodiments, the machine learning engine 5 is configured to perform various aspects of embodiments of one or more of the proposed methods as described herein, such as, when operating in an inference mode, determining a prediction of bitrate gain to be expected when allocating additional computational resources (such as, for example, allocating one or more additional CPU cores) to the encoding of the multimedia content stream corresponding to a channel, based on one or more multimedia content characteristics of the multimedia content stream and on one or more multimedia content encoding parameters for encoding the multimedia content stream provided as input data to a neural network implemented by the machine learning engine 5. The machine learning engine 5 may further be configured to operate in a training mode to train the neural network based on training data. In some embodiments, the machine learning engine 5 may be configured for implementing an artificial intelligence algorithm using a neural network, such as for example a supervised learning algorithm. The machine learning engine 5 may additionally be configured for implementing the functions or embodiments provided in the present subject disclosure with respect to training the artificial intelligence algorithm or using the artificial intelligence algorithm for obtaining bitrate gain predictions.

In some embodiments, the data interface engine 4 is configured to receive as input data one or more multimedia content streams to be encoded by a computing platform configured with computation resources, for distribution in dynamic mode to viewing devices through a distribution network, such as for example comprising a CDN, and to output computational resource allocation configuration for the encoding of one or more of the multimedia content streams. The computational resource allocation configuration may, depending on the embodiment, define allocation of computational resources of the computing platform for encoding one or more of the multimedia content streams to be distributed in live mode. In some embodiments, the computational resource allocation configuration may define allocation of all of the computational resources of the computing platform among all of the one or more of the multimedia content streams to be encoded and distributed in live mode.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 6, capable of storing computer program instructions or software code that, when executed by the processor, causes the processor to perform the elements described herein. In addition, the memory 6 may be any type of data storage computer storage medium, capable of storing resource data, including resource allocation rules, resource allocation status, and resource status data (e.g. CPU status data) for use according to one or more embodiments of the present subject disclosure, coupled to the control engine 2 and operable with the data interface engine 4, machine learning engine 5, and the computational resource allocation engine 3 to facilitate management and processing of resource data stored in association therewith.

In embodiments of the present subject disclosure, the apparatus 1 is configured for performing the computational resource allocation methods described herein.

It will be appreciated that the apparatus 1 shown and described with reference to FIG. 5 is provided by way of example only. Numerous other architectures, operating environments, and configurations are possible. Other embodiments of the node may include fewer or greater number of components, and may incorporate some or all of the functionality described with respect to the apparatus components shown in FIG. 5. Accordingly, although the control engine 2, computational resource allocation engine 3, data interface engine 4, machine learning engine 5, and memory 6 are illustrated as part of the apparatus 1, no restrictions are placed on the location and control of components 2-6. In particular, in other embodiments, components 2-6 may be part of different entities or computing systems.

While the subject disclosure has been described with respect to preferred embodiments, those skilled in the art will readily appreciate that various changes and/or modifications can be made to the present subject disclosure without departing from the spirit or scope of the present subject disclosure as defined by the appended claims.

Although this subject disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the subject disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for managing computational resources allocated for encoding of one or more multimedia content streams for distribution in dynamic mode to viewing devices through a distribution network, the method comprising, by a processing node of the distribution network:

obtaining, for a multimedia content stream corresponding to a channel distributed to the viewing devices, a value of a computational resource allocation criterion, wherein the computational resource allocation criterion comprises an audience measurement for the corresponding channel and a video content complexity of the multimedia content stream;

determining, based on the computational resource allocation criterion, an allocation of computational resources of a computing platform configured for encoding the multimedia content stream;

obtaining respective computational resource allocation criterion levels for a plurality of multimedia content streams respectively corresponding to channels in a plurality of channels distributed to viewers;

performing one or more iterations of a channel allocation loop, wherein an iteration of index i comprises, for a current channel of the plurality of channels: determine for the current channel a respective channel gain based on a rate-distortion criterion $J_i = R_i + \lambda \cdot D_i$, where $D_i$ is a distortion measurement, $\lambda$ is a Lagrangian parameter, and $R_i$ is an overall bitrate measurement, wherein $R_i$ is determined based on an audience measurement for the current channel and an estimate of gain in bitrate reduction obtained if the current channel is allocated additional computation resources for encoding the corresponding multimedia content stream, and wherein $D_i$ is determined based on a distortion measurement and an audience measurement for the current channel;

selecting, in the plurality of channels, a channel based on one or more respective channel gains; and allocating additional computational resources to encoding the multimedia content stream corresponding to the selected channel.

2. The method according to claim 1, further comprising:
determining an allocation of computational resources that minimizes an overall bitrate of a plurality of multimedia content streams after encoding, while maximizing a video quality by minimizing a distortion incurred by encoding the plurality of multimedia content streams.

3. The method according to claim 1, further comprising:
determining an allocation of computational resources that minimizes an overall bitrate of a plurality of multimedia content streams after encoding, while maximizing a quality of experience for channels corresponding to the plurality of multimedia content streams.

4. The method according to claim 1, further comprising:
determining, for the channel, an estimate of gain in bitrate reduction obtained if the channel is allocated additional computation resources for encoding the corresponding multimedia content stream.

5. The method according to claim 1, wherein the overall bitrate measurement $R_i$ is determined based on a product of $v_i$ with the estimate of gain, wherein $v_i$ is an audience measurement for the current channel.

6. The method according to claim 1, wherein the overall bitrate measurement $R_i$ is determined based on a product of $(1+v_i)$ with the estimate of gain, wherein $v_i$ is an audience measurement for the current channel.

7. The method according to claim 1, wherein the distribution network comprises a content delivery network, CDN, wherein the overall bitrate measurement $R_i$ is determined based on a product of $(\Sigma_{j=1}^{M} k_j + v_i)$ with the estimate of gain, wherein $v_i$ is an audience measurement for the current channel, M is a number of regions in the CDN, and $k_j$ is a weight value of index j assigned to an edge cache used for distribution of the current channel in the CDN.

8. The method according to claim 1, wherein the distortion measurement of $D_i$ is determined based on $d_i$, a distortion measurement for the current channel, and/or $QoE_i$, a Quality of Experience measurement for the current channel.

9. The method according to claim 8, wherein the distortion measurement of $D_i$ is determined based on the Quality of Experience measurement for the current channel $QoE_i$, and wherein the Quality of Experience, QoE, measurement for the current channel is determined based on one or more of the following QoE metrics: average of time taken by each player to start playback; average of rebuffering time for all viewers; average of latencies to get the frame for all viewers; number of failed playback attempts; average number of dropped frames for all viewers of the channel; and average of rebuffering frequency for all viewers of the channel.

10. The method according to claim 4, wherein the estimate of gain in bitrate reduction is determined based on a prediction of bitrate gain determined using a machine learning algorithm.

11. The method according to claim 10, wherein the machine learning algorithm is configured to receive input data corresponding to one or more of the following input data parameters: current CPU allocation, current video quality, estimated video content complexity, video content frame width, video content frame height, video content frame rate, interlaced or progressive video content, and type of encoder.

12. The method according to claim 10, wherein the machine learning algorithm is a supervised learning algorithm, the method further comprising: performing a training phase for training the supervised learning algorithm during which the supervised learning algorithm is trained with training data.

13. The method according to claim 12, wherein the supervised learning algorithm is configured to use online learning for performing an ongoing training during an inference phase of the supervised learning algorithm.

14. The method according to claim 4, wherein the additional computational resources comprise an additional CPU core used for encoding the corresponding multimedia content stream.

15. An apparatus, the apparatus comprising a processor and a memory operatively coupled to the processor, wherein the apparatus is configured to perform a method for managing computational resources allocated for encoding of one or more multimedia content streams for distribution in dynamic mode to viewing devices through a distribution network, the method comprising, by a processing node of the distribution network:

obtaining, for a multimedia content stream corresponding to a channel distributed to the viewing devices, a value of a computational resource allocation criterion, wherein the computational resource allocation criterion comprises an audience measurement for the corresponding channel and a video content complexity of the multimedia content stream; and determining, based on the computational resource allocation criterion, an allocation of computational resources of a computing platform configured for encoding the multimedia content stream;

obtaining respective computational resource allocation criterion levels for a plurality of multimedia content streams respectively corresponding to channels in a plurality of channels distributed to viewers;

performing one or more iterations of a channel allocation loop, wherein an iteration of index i comprises, for a current channel of the plurality of channels: determine for the current channel a respective channel gain based on a rate-distortion criterion $J_i = R_i + \lambda \cdot D_i$, where $D_i$ is a distortion measurement, $\lambda$ is a Lagrangian parameter, and $R_i$ is an overall bitrate measurement, wherein $R_i$ is determined based on an audience measurement for the current channel and an estimate of gain in bitrate reduction obtained if the current channel is allocated additional computation resources for encoding the corresponding multimedia content stream, and wherein $D_i$ is determined based on a distortion measurement and an audience measurement for the current channel;

selecting, in the plurality of channels, a channel based on one or more respective channel gains; and allocating additional computational resources to encoding the multimedia content stream corresponding to the selected channel.

16. A non-transitory computer-readable medium encoded with executable instructions which, when executed, causes an apparatus comprising a processor operatively coupled with a memory, to perform a method for managing computational resources allocated for encoding of one or more multimedia content streams for distribution in dynamic mode to viewing devices through a distribution network, the method comprising, by a processing node of the distribution network:

obtaining, for a multimedia content stream corresponding to a channel distributed to the viewing devices, a value of a computational resource allocation criterion, wherein the computational resource allocation criterion comprises an audience measurement for the corresponding channel and a video content complexity of the multimedia content stream; and determining, based on the computational resource allocation criterion, an allocation of computational resources of a computing platform configured for encoding the multimedia content stream;

obtaining respective computational resource allocation criterion levels for a plurality of multimedia content streams respectively corresponding to channels in a plurality of channels distributed to viewers;

performing one or more iterations of a channel allocation loop, wherein an iteration of index i comprises, for a current channel of the plurality of channels: determine for the current channel a respective channel gain based on a rate-distortion criterion $J_i = R_i + \lambda \cdot D_i$, where $D_i$ is a distortion measurement, $\lambda$ is a Lagrangian parameter, and $R_i$ is an overall bitrate measurement, wherein $R_i$ is determined based on an audience measurement for the current channel and an estimate of gain in bitrate reduction obtained if the current channel is allocated additional computation resources for encoding the corresponding multimedia content stream, and wherein $D_i$ is determined based on a distortion measurement and an audience measurement for the current channel;

selecting, in the plurality of channels, a channel based on one or more respective channel gains; and allocating additional computational resources to encoding the multimedia content stream corresponding to the selected channel.

17. The apparatus according to claim 15, wherein the method further comprises: determining an allocation of computational resources that minimizes an overall bitrate of a plurality of multimedia content streams after encoding, while maximizing a video quality by minimizing a distortion incurred by encoding the plurality of multimedia content streams.

18. The method according to claim 15, wherein the method further comprises: determining an allocation of computational resources that minimizes an overall bitrate of a plurality of multimedia content streams after encoding, while maximizing a quality of experience for channels corresponding to the plurality of multimedia content streams.

19. The non-transitory computer-readable medium according to claim 16, wherein the method further comprises: determining an allocation of computational resources that minimizes an overall bitrate of a plurality of multimedia content streams after encoding, while maximizing a video quality by minimizing a distortion incurred by encoding the plurality of multimedia content streams.

* * * * *